(12) United States Patent
Agarwal et al.

(10) Patent No.: US 9,021,014 B2
(45) Date of Patent: Apr. 28, 2015

(54) METHODS, SYSTEMS, AND COMPUTER READABLE MEDIA FOR PROVIDING HOME SUBSCRIBER SERVER (HSS) PROXY

(75) Inventors: Devesh Agarwal, Raleigh, NC (US); Apirux Bantukul, Cary, NC (US)

(73) Assignee: Tekelec, Inc., Morrisville, NC (US)

( * ) Notice: Subject to any disclaimer, the term of this patent is extended or adjusted under 35 U.S.C. 154(b) by 539 days.

(21) Appl. No.: 12/732,178

(22) Filed: Mar. 25, 2010

(65) Prior Publication Data

US 2010/0250662 A1    Sep. 30, 2010

Related U.S. Application Data

(60) Provisional application No. 61/163,435, filed on Mar. 25, 2009.

(51) Int. Cl.
| | |
|---|---|
| *G06F 15/16* | (2006.01) |
| *H04W 88/18* | (2009.01) |
| *H04L 29/12* | (2006.01) |
| *H04W 8/04* | (2009.01) |

(Continued)

(52) U.S. Cl.
CPC ....... *H04W 88/182* (2013.01); *H04L 29/12188* (2013.01); *H04L 61/1588* (2013.01); *H04W 8/04* (2013.01); *H04W 92/02* (2013.01); *H04W 92/24* (2013.01)

(58) Field of Classification Search
CPC . H04L 65/1006; H04L 65/1016; H04L 12/66; H04L 65/105; H04W 4/025
USPC .......................................................... 709/203
See application file for complete search history.

(56) References Cited

U.S. PATENT DOCUMENTS

| | | |
|---|---|---|
| 4,310,727 A | 1/1982 | Lawser |
| 4,754,479 A | 6/1988 | Bicknell et al. |
| 5,089,954 A | 2/1992 | Rago |

(Continued)

FOREIGN PATENT DOCUMENTS

| | | |
|---|---|---|
| CN | 200680051295.9 | 3/2013 |
| EP | 0 512 962 A2 | 11/1992 |

(Continued)

OTHER PUBLICATIONS

Communication under Rule 71(3) EPC for European Application No. 06 844 747.3 (Jul. 19, 2011).

(Continued)

*Primary Examiner* — Lynn Feild
*Assistant Examiner* — Jonathan Bui
(74) *Attorney, Agent, or Firm* — Jenkins, Wilson, Taylor & Hunt, P.A.

(57) ABSTRACT

Methods, systems, and computer readable media for providing a home subscriber server (HSS) proxy are disclosed. According to one aspect, the subject matter described herein includes a method for providing a home subscriber server proxy. The method includes, at a node separate from a home subscriber server in a telecommunications network, receiving, from a requesting network entity, a request for information maintained at a home subscriber server, the information being associated with a subscriber, and, in response to receiving the request for information maintained at a home subscriber server, providing the information associated with the subscriber to the requesting network entity on behalf of the home subscriber server.

21 Claims, 13 Drawing Sheets

(51) Int. Cl.
*H04W 92/02* (2009.01)
*H04W 92/24* (2009.01)

(56) References Cited

U.S. PATENT DOCUMENTS

| | | | |
|---|---|---|---|
| 5,237,604 A | 8/1993 | Ryan | |
| 5,247,571 A | 9/1993 | Kay et al. | |
| 5,251,248 A | 10/1993 | Tokunaga et al. | |
| 5,400,390 A | 3/1995 | Salin | |
| 5,420,916 A | 5/1995 | Sekiguchi | |
| 5,422,941 A | 6/1995 | Hasenauer et al. | |
| 5,423,068 A | 6/1995 | Hecker | |
| 5,430,719 A | 7/1995 | Weisser, Jr. | |
| 5,442,683 A | 8/1995 | Hoogeveen | |
| 5,455,855 A | 10/1995 | Hokari | |
| 5,457,736 A | 10/1995 | Cain et al. | |
| 5,475,732 A | 12/1995 | Pester, III | |
| 5,481,603 A | 1/1996 | Gutierrez et al. | |
| 5,502,726 A | 3/1996 | Fischer | |
| 5,504,804 A | 4/1996 | Widmark et al. | |
| 5,526,400 A | 6/1996 | Nguyen | |
| 5,579,372 A | 11/1996 | Åström | |
| 5,590,398 A | 12/1996 | Matthews | |
| 5,594,942 A | 1/1997 | Antic et al. | |
| 5,623,532 A | 4/1997 | Houde et al. | |
| 5,689,548 A | 11/1997 | Maupin et al. | |
| 5,706,286 A | 1/1998 | Reiman et al. | |
| 5,711,002 A | 1/1998 | Foti | |
| 5,812,639 A | 9/1998 | Bartholomew et al. | |
| 5,819,178 A | 10/1998 | Cropper | |
| 5,822,694 A | 10/1998 | Coombes et al. | |
| 5,832,382 A | 11/1998 | Alperovich | |
| 5,841,854 A | 11/1998 | Schumacher et al. | |
| 5,852,660 A | 12/1998 | Lindquist et al. | |
| 5,854,982 A | 12/1998 | Chambers et al. | |
| 5,862,481 A | 1/1999 | Kulkarni et al. | |
| 5,867,788 A | 2/1999 | Joensuu | |
| 5,878,347 A | 3/1999 | Joensuu et al. | |
| 5,878,348 A | 3/1999 | Foti | |
| 5,889,849 A | 3/1999 | Ban et al. | |
| 5,890,063 A | 3/1999 | Mills | |
| 5,953,662 A | 9/1999 | Lindquist et al. | |
| 5,953,663 A | 9/1999 | Maupin et al. | |
| 5,983,217 A | 11/1999 | Khosravi-Sichannie et al. | |
| 6,006,098 A | 12/1999 | Rathnasabapathy et al. | |
| 6,011,803 A | 1/2000 | Bicknell et al. | |
| 6,014,557 A | 1/2000 | Morton et al. | |
| 6,018,657 A | 1/2000 | Kennedy, III et al. | |
| 6,038,456 A | 3/2000 | Colby et al. | |
| 6,049,714 A | 4/2000 | Patel | |
| 6,094,578 A | 7/2000 | Purcell et al. | |
| 6,097,960 A | 8/2000 | Rathnasabapathy et al. | |
| 6,115,463 A | 9/2000 | Coulombe et al. | |
| H1895 H | 10/2000 | Hoffpauir et al. | |
| 6,128,377 A | 10/2000 | Sonnenberg | |
| 6,130,939 A * | 10/2000 | Cochinwala et al. | 379/220.01 |
| 6,134,441 A | 10/2000 | ÅAström et al. | |
| 6,134,447 A | 10/2000 | Havinis et al. | |
| 6,137,806 A | 10/2000 | Martinez | |
| 6,138,007 A | 10/2000 | Bharatia | |
| 6,138,016 A | 10/2000 | Kulkarni et al. | |
| 6,138,017 A | 10/2000 | Price et al. | |
| 6,138,023 A | 10/2000 | Agarwal et al. | |
| 6,144,857 A | 11/2000 | Price et al. | |
| 6,148,204 A | 11/2000 | Urs et al. | |
| 6,175,743 B1 | 1/2001 | Alperovich et al. | |
| 6,178,181 B1 | 1/2001 | Glitho | |
| 6,192,242 B1 | 2/2001 | Rollender | |
| 6,205,210 B1 | 3/2001 | Rainey et al. | |
| 6,208,870 B1 | 3/2001 | Lorello et al. | |
| 6,226,517 B1 | 5/2001 | Britt et al. | |
| 6,236,365 B1 | 5/2001 | LeBlanc et al. | |
| 6,263,212 B1 | 7/2001 | Ross et al. | |
| 6,292,669 B1 | 9/2001 | Meuronen et al. | |
| 6,298,232 B1 | 10/2001 | Marin et al. | |
| 6,308,075 B1 | 10/2001 | Irten et al. | |
| 6,324,279 B1 | 11/2001 | Kalmanek et al. | |
| 6,327,350 B1 | 12/2001 | Spangler et al. | |
| 6,338,140 B1 | 1/2002 | Owens et al. | |
| 6,356,529 B1 | 3/2002 | Zarom | |
| 6,363,431 B1 | 3/2002 | Hammer et al. | |
| 6,377,674 B1 | 4/2002 | Chong et al. | |
| 6,377,807 B1 | 4/2002 | Iparrea et al. | |
| 6,411,632 B2 | 6/2002 | Lindgren et al. | |
| 6,421,674 B1 | 7/2002 | Yoakum et al. | |
| 6,424,832 B1 | 7/2002 | Britt et al. | |
| 6,434,127 B1 | 8/2002 | Ha | |
| 6,453,174 B1 | 9/2002 | Cunningham et al. | |
| 6,463,055 B1 | 10/2002 | Lupien et al. | |
| 6,493,551 B1 | 12/2002 | Wang et al. | |
| 6,505,046 B1 | 1/2003 | Baker | |
| 6,512,926 B1 | 1/2003 | Henry-Labordere | |
| 6,515,997 B1 | 2/2003 | Feltner et al. | |
| 6,519,242 B1 | 2/2003 | Emery et al. | |
| 6,519,468 B1 | 2/2003 | Donovan et al. | |
| 6,529,524 B1 | 3/2003 | Liao et al. | |
| 6,535,746 B1 | 3/2003 | Yu et al. | |
| 6,560,216 B1 | 5/2003 | McNiff et al. | |
| 6,560,456 B1 | 5/2003 | Lohtia et al. | |
| 6,574,481 B1 | 6/2003 | Rathnasabapathy et al. | |
| 6,577,723 B1 | 6/2003 | Mooney | |
| 6,594,258 B1 | 7/2003 | Larson et al. | |
| 6,611,516 B1 | 8/2003 | Pirkola et al. | |
| 6,615,037 B1 | 9/2003 | Bharatia et al. | |
| 6,625,461 B1 | 9/2003 | Bertacchi | |
| 6,643,511 B1 | 11/2003 | Rune et al. | |
| 6,662,017 B2 | 12/2003 | McCann et al. | |
| 6,683,881 B1 | 1/2004 | Mijares et al. | |
| 6,684,073 B1 | 1/2004 | Joss et al. | |
| 6,697,620 B1 | 2/2004 | Lamb et al. | |
| 6,731,926 B1 | 5/2004 | Link, II et al. | |
| 6,738,636 B2 | 5/2004 | Lielbriedis | |
| 6,745,041 B2 | 6/2004 | Allison et al. | |
| 6,795,701 B1 | 9/2004 | Baker et al. | |
| 6,801,781 B1 | 10/2004 | Provost et al. | |
| 6,819,932 B2 | 11/2004 | Allison et al. | |
| 6,826,397 B1 | 11/2004 | Vasa | |
| 6,836,477 B1 | 12/2004 | West, Jr. et al. | |
| 6,850,768 B2 | 2/2005 | Foll | |
| 6,865,191 B1 | 3/2005 | Bengtsson et al. | |
| 6,885,872 B2 | 4/2005 | McCann et al. | |
| 6,912,389 B2 | 6/2005 | Bright et al. | |
| 6,917,612 B2 | 7/2005 | Foti et al. | |
| 6,950,441 B1 | 9/2005 | Kaczmarczyk et al. | |
| 6,993,038 B2 | 1/2006 | McCann | |
| 7,035,239 B2 | 4/2006 | McCann et al. | |
| 7,039,037 B2 | 5/2006 | Wang et al. | |
| 7,043,002 B2 | 5/2006 | Delaney et al. | |
| 7,079,524 B2 | 7/2006 | Bantukul et al. | |
| 7,079,853 B2 | 7/2006 | Rathnasabapathy et al. | |
| 7,092,505 B2 | 8/2006 | Allison et al. | |
| 7,113,795 B2 | 9/2006 | Somani et al. | |
| 7,113,800 B2 | 9/2006 | Linkola | |
| 7,145,875 B2 | 12/2006 | Allison et al. | |
| 7,177,398 B2 | 2/2007 | Meer et al. | |
| 7,177,399 B2 | 2/2007 | Dawson et al. | |
| 7,181,194 B2 | 2/2007 | McCann et al. | |
| 7,190,959 B2 | 3/2007 | Palmer et al. | |
| 7,221,929 B2 | 5/2007 | Lee et al. | |
| 7,221,952 B2 | 5/2007 | Cho et al. | |
| 7,257,401 B1 | 8/2007 | Dizdarevic et al. | |
| 7,274,683 B2 | 9/2007 | Segal | |
| 7,286,839 B2 | 10/2007 | McCann et al. | |
| 7,292,592 B2 | 11/2007 | Rune | |
| 7,366,945 B2 | 4/2008 | Wang et al. | |
| 7,397,773 B2 | 7/2008 | Qu et al. | |
| 7,453,876 B2 | 11/2008 | Hua et al. | |
| 7,551,608 B1 | 6/2009 | Roy | |
| 7,583,646 B2 | 9/2009 | Hua et al. | |
| 7,627,331 B2 | 12/2009 | Winterbottom et al. | |
| 7,668,543 B2 | 2/2010 | Müller | |
| 7,729,485 B2 * | 6/2010 | Koskinen et al. | 379/115.01 |
| 7,746,864 B1 | 6/2010 | Asawa et al. | |
| 7,801,116 B2 | 9/2010 | Westman | |

(56) References Cited

U.S. PATENT DOCUMENTS

| | | | |
|---|---|---|---|
| 7,844,745 B1 | 11/2010 | Darbyshire et al. | |
| 7,848,767 B2 | 12/2010 | McCann et al. | |
| 7,889,716 B2 | 2/2011 | Tejani et al. | |
| 7,894,353 B2 | 2/2011 | Li et al. | |
| 7,916,857 B2 | 3/2011 | Palmer et al. | |
| 7,962,120 B2 | 6/2011 | Cai et al. | |
| 8,041,349 B2 | 10/2011 | Fukui et al. | |
| 8,175,236 B2 | 5/2012 | Pandey et al. | |
| 8,194,634 B2 | 6/2012 | Delker et al. | |
| 8,195,161 B2 | 6/2012 | Bumiller | |
| 8,208,461 B2 | 6/2012 | Mitchell | |
| 8,380,209 B1 | 2/2013 | Sylvain | |
| 8,391,833 B2 | 3/2013 | Agarwal | |
| 8,644,355 B2 | 2/2014 | Agarwal et al. | |
| 8,750,292 B2 | 6/2014 | Agarwal et al. | |
| 8,855,654 B2 | 10/2014 | Agarwal | |
| 2001/0006897 A1 | 7/2001 | Kang et al. | |
| 2001/0029182 A1 | 10/2001 | McCann et al. | |
| 2001/0030957 A1 | 10/2001 | McCann et al. | |
| 2001/0040957 A1 | 11/2001 | McCann et al. | |
| 2001/0046856 A1 | 11/2001 | McCann | |
| 2002/0132636 A1 | 9/2002 | Stockhusen | |
| 2002/0147845 A1 | 10/2002 | Sanchez-Herrero et al. | |
| 2002/0173320 A1 | 11/2002 | Aitken et al. | |
| 2002/0176382 A1 | 11/2002 | Madour et al. | |
| 2003/0003930 A1 | 1/2003 | Allison et al. | |
| 2003/0007482 A1 | 1/2003 | Khello et al. | |
| 2003/0016684 A1 | 1/2003 | Prasad et al. | |
| 2003/0026289 A1 | 2/2003 | Mukherjee et al. | |
| 2003/0054844 A1 | 3/2003 | Anvekar et al. | |
| 2003/0061234 A1 | 3/2003 | Ali et al. | |
| 2003/0065788 A1 | 4/2003 | Salomaki | |
| 2003/0081754 A1 | 5/2003 | Esparza et al. | |
| 2003/0109271 A1 | 6/2003 | Lewis et al. | |
| 2003/0157938 A1 | 8/2003 | Haase et al. | |
| 2003/0193967 A1 | 10/2003 | Fenton et al. | |
| 2003/0227899 A1 | 12/2003 | McCann | |
| 2004/0076126 A1 | 4/2004 | Qu et al. | |
| 2004/0081206 A1 | 4/2004 | Allison et al. | |
| 2004/0082332 A1 | 4/2004 | McCann et al. | |
| 2004/0087300 A1 | 5/2004 | Lewis | |
| 2004/0125925 A1 | 7/2004 | Marsot | |
| 2004/0132451 A1 | 7/2004 | Butehorn et al. | |
| 2004/0142707 A1 | 7/2004 | Midkiff et al. | |
| 2004/0198351 A1 | 10/2004 | Knotts | |
| 2004/0202187 A1 | 10/2004 | Kelly et al. | |
| 2004/0203914 A1 | 10/2004 | Kall et al. | |
| 2004/0219935 A1 | 11/2004 | McCann et al. | |
| 2004/0246965 A1 | 12/2004 | Westman et al. | |
| 2004/0264674 A1 | 12/2004 | Delaney et al. | |
| 2005/0003838 A1 | 1/2005 | McCann et al. | |
| 2005/0111641 A1* | 5/2005 | Koskinen et al. | 379/114.2 |
| 2005/0119017 A1 | 6/2005 | Lovell, Jr. et al. | |
| 2005/0238048 A1 | 10/2005 | Delaney et al. | |
| 2006/0034256 A1 | 2/2006 | Addagatla et al. | |
| 2006/0067338 A1 | 3/2006 | Hua et al. | |
| 2006/0079236 A1* | 4/2006 | Del Pino et al. | 455/445 |
| 2006/0098621 A1 | 5/2006 | Plata et al. | |
| 2006/0136557 A1 | 6/2006 | Schaedler et al. | |
| 2006/0281492 A1 | 12/2006 | Jiang | |
| 2007/0061397 A1 | 3/2007 | Gregorat et al. | |
| 2007/0066326 A1 | 3/2007 | Agarwal et al. | |
| 2007/0104184 A1 | 5/2007 | Ku et al. | |
| 2007/0133574 A1 | 6/2007 | Tejani et al. | |
| 2007/0207802 A1 | 9/2007 | Palmer et al. | |
| 2007/0209061 A1 | 9/2007 | Dekeyzer et al. | |
| 2007/0254681 A1 | 11/2007 | Horvath et al. | |
| 2007/0258575 A1* | 11/2007 | Douglas et al. | 379/221.13 |
| 2007/0288655 A1 | 12/2007 | Price et al. | |
| 2007/0297419 A1* | 12/2007 | Askerup et al. | 370/395.52 |
| 2008/0039104 A1 | 2/2008 | Gu et al. | |
| 2008/0176538 A1 | 7/2008 | Terrill et al. | |
| 2008/0198862 A1* | 8/2008 | Bantukul et al. | 370/401 |
| 2008/0233931 A1 | 9/2008 | Shim | |
| 2008/0248820 A1 | 10/2008 | Lohtia | |
| 2009/0003388 A1* | 1/2009 | Florkey et al. | 370/503 |
| 2009/0129372 A1 | 5/2009 | Pandey et al. | |
| 2009/0227276 A1 | 9/2009 | Agarwal et al. | |
| 2009/0232011 A1 | 9/2009 | Li et al. | |
| 2010/0113016 A1* | 5/2010 | Gayde et al. | 455/433 |
| 2010/0217858 A1* | 8/2010 | Przybysz et al. | 709/224 |
| 2010/0278041 A1 | 11/2010 | Shi | |
| 2010/0299451 A1 | 11/2010 | Yigang et al. | |
| 2010/0331023 A1 | 12/2010 | Cai et al. | |
| 2011/0067085 A1 | 3/2011 | Brouard | |
| 2011/0222532 A1* | 9/2011 | Noldus | 370/352 |
| 2012/0034900 A1 | 2/2012 | Agarwal | |
| 2012/0127926 A1 | 5/2012 | Drevon et al. | |
| 2012/0163297 A1 | 6/2012 | Agarwal et al. | |
| 2012/0179827 A1* | 7/2012 | Xue et al. | 709/227 |
| 2012/0202550 A1 | 8/2012 | Marsico | |
| 2012/0224524 A1 | 9/2012 | Marsico | |
| 2012/0224563 A1 | 9/2012 | Zisimopoulous et al. | |
| 2012/0287844 A1 | 11/2012 | Ophir et al. | |
| 2013/0065606 A1 | 3/2013 | Kurokawa et al. | |
| 2013/0157620 A1 | 6/2013 | Marsico | |
| 2014/0213265 A1 | 7/2014 | Agarwal | |

FOREIGN PATENT DOCUMENTS

| | | |
|---|---|---|
| EP | 0 788 283 A2 | 8/1997 |
| EP | 0 936 825 A3 | 8/1999 |
| EP | 0 944 276 A1 | 9/1999 |
| EP | 1 558 004 A | 7/2005 |
| EP | 1 742 452 A1 | 1/2007 |
| EP | 1 950 942 A1 | 7/2008 |
| KR | 10-2004-0107271 A | 12/2004 |
| WO | WO 95/12292 A1 | 5/1995 |
| WO | WO 96/11557 | 4/1996 |
| WO | WO 97/03441 A1 | 9/1997 |
| WO | WO 98/56195 | 12/1998 |
| WO | WO 99/11087 A2 | 3/1999 |
| WO | WO 99/57926 | 11/1999 |
| WO | WO 00/16583 A1 | 3/2000 |
| WO | WO 01/47297 A2 | 6/2001 |
| WO | WO 01/48981 A1 | 7/2001 |
| WO | WO 01/54444 A1 | 7/2001 |
| WO | WO 02/060192 A2 | 8/2001 |
| WO | WO 03/005664 A2 | 1/2003 |
| WO | WO 03/021982 A1 | 3/2003 |
| WO | WO 03/105382 A1 | 12/2003 |
| WO | WO 2004/006534 | 1/2004 |
| WO | WO 2004/087686 A | 1/2004 |
| WO | WO 2004/075507 | 9/2004 |
| WO | WO 2004/102345 A2 | 11/2004 |
| WO | WO 2005/002311 A2 | 1/2005 |
| WO | WO 2005/013538 A3 | 2/2005 |
| WO | WO 2006/072473 A1 | 7/2006 |
| WO | WO 2007/045991 A1 | 4/2007 |
| WO | WO 2007/064943 A2 | 6/2007 |
| WO | WO 2007/092205 A2 | 8/2007 |
| WO | WO 2007/095379 A2 | 8/2007 |
| WO | WO 2007/146257 A2 | 12/2007 |
| WO | WO 2008/157213 A2 | 12/2008 |
| WO | WO 2009/023573 A2 | 2/2009 |
| WO | WO 2011/106690 A2 | 9/2011 |
| WO | WO 2012/088497 A1 | 6/2012 |

OTHER PUBLICATIONS

Chinese Official Action for Chinese Patent Application No. 200680051295.9 (Dec. 24, 2010).

Notification of Transmittal of the International Search Report and the Written Opinion of the International Searching Authority, or the Declaration for International Application No. PCT/US2010/028762 (Oct. 27, 2010).

Notice of Allowance and Fee(s) Due for U.S. Appl. No. 11/291,502 (Oct. 5, 2010).

Notice of Allowance and Fee(s) Due for U.S. Appl. No. 10/405,859 (Aug. 5, 2010).

Notice of Allowance and Fee(s) Due for U.S. Appl. No. 10/405,859 (Mar. 9, 2010).

Final Office Action for U.S. Appl. No. 13/035,656 (Feb. 12, 2013).

(56) References Cited

OTHER PUBLICATIONS

First Examination Report for Indian Application No. 3231/CHENP/2008 (Jan. 2, 2013).
Non-Final Office Action for U.S. Appl. No. 13/336,132 (Dec. 18, 2012).
Commonly-assigned, co-pending U.S. Appl. No. 13/714,360 for "Methods, Systems, and Computer Readable Media for Seamless Roaming Between Diameter and Non-Diameter Networks," (Unpublished, filed Dec. 13, 2012).
Non-Final Official Action for U.S. Appl. No. 13/035,656 (Aug. 23, 2012).
U.S. Appl. No. 61/291,961 for "A GTP Relay for Direct Internet Access from the Roaming Mobile Network and Other Services," (Unpublished, filed Jan. 4, 2010).
Calhoun et al., "Diameter Base Protcol," Network Working Group, RFC 3588 (Sep. 2003).
Notice of Allowance and Fee(s) Due for U.S. Appl. No. 13/336,132 (May 20, 2013).
Commonly-assigned, co-pending U.S. Appl. No. 13/752,369 for "Methods, Systems, and Computer Readable Media for Tracking and Communicating Long Term Evolution (LTE) Handset Communication Capability," (Unpublished, filed Jan. 28, 2013).
Notice of Allowance and Fee(s) Due for U.S. Appl. No. 11/706,837 (May 27, 2010).
Communication Pursuant to Article 94(3) EPC for European Application No. 06844747.7 (May 11, 2010).
Final Official Action for U.S. Appl. No. 11/291,502 (Feb. 4, 2010).
"Diameter (Protocol)," Wikipedia, pp. 1-8 (Document last modified on Jan. 16, 2010).
Final Official Action for U.S. Appl. No. 11/706,837 (Dec. 15, 2009).
Interview Summary for U.S. Appl. No. 11/706,837 (Oct. 26, 2009).
Official Action for U.S. Appl. No. 10/405,859 (Aug. 3, 2009).
Communication pursuant to Article 94(3) EPC for European application No. 06844747.3 (Jul. 28, 2009).
Official Action for U.S. Appl. No. 11/706,837 (May 13, 2009).
Official Action for U.S. Appl. No. 11/291,502 (May 13, 2009).
Supplementary European Search Report for European Application No. 06844747.3 (Apr. 24, 2009).
Final Official Action for U.S. Appl. No. 10/405,859 (Jan. 6, 2009).
3GPP, "Digital Cellular Telecommunications System (Phase 2+); Universal Mobile Telecommunications System (UMTS); LTE; IP Multimedia (IM) Subsystem Cx and Dx Interfaces; Signalling Flows and Message Contents," ETSI TS 129 228 V8.4.0 (Jan. 2009).
Notification Concerning Transmittal of International Preliminary Report on Patentability for International Application No. PCT/US2006/046108 (Oct. 2, 2008).
Notification of Transmittal of the International Search Report and the Written Opnion of the International Searching Authority, or the Delcaration for International Application No. PCT/US2006/046108 (Sep. 9, 2008).
Interview Summary for U.S. Appl. No. 10/405,859 (Aug. 20, 2008).
Official Action for U.S. Appl. No. 11/706,837 (Jul. 29, 2008).
Communication of European publication number and information on the application of Article 67(3) EPC for Application No. 06844747.3 (Jul. 23, 2008).
Notification of Transmittal of the International Search Report and the Written Opinion of the International Searching Authority, or the Declaration for International Application No. PCT/US07/04175 (Jul. 22, 2008).
Official Action for U.S. Appl. No. 10/405,859 (Mar. 17, 2008).
Restriction Requirement for U.S. Appl. No. 10/405,859 (Feb. 6, 2008).
"IP Multimedia Subsystem," printout from wikipedia.org, Wikimedia Foundation, Inc. (May 29, 2007).
Supplementary European Search Report for European application No. 04 756 094.1 (Mar. 29, 2007).
"HP OperCall Home Subscriber Server Software—Data Sheet", 4AA0-3360ENW Rev. 2, Hewlett-Packard Development Company, L.P. (Jul. 2006).

Camarillo et al., "The Session Initiation Protocol (SIP) P-User-Database Private-Header (P-Header)," Network Working Group, RFC 4457, pp. 1-8 (Apr. 2006).
Liu et al., "Introduction to Diameter," IBM, pp. 1-12 (Jan. 24, 2006).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
International Search Report in PCT Application No. 03/32626 (Mar. 5, 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Walker, "The IP Revolution in Mobile Messaging," Packet, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 for Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Moodie, "Agilent acceSS7: White Paper," Agilent Technologies, pp. 1-14 (Apr. 1, 2003).
"Cisco IP Transfer Point," Cisco Systems, Inc., pp. 1-10 (Copyright 1992-2003).
"Cisco IP Transfer Point Multilayer Short Message Serivce Routing Solution," Cisco Systems, Inc., pp. 1-6 (Copyright 1992-2003).
"Cisco ITP MAP Gateway for Public WLAN Slm Authentication and Authorization," Cisco Systems, Inc., pp. 1-13 (Copyright 1992-2003).
Barry, "A Signal for Savings," Packet, Cisco Systems Users Magazine, vol. 14, No. 4, pp. Cover; 19-21; and 81 (Fourth Quarter 2002).
"Agilent Tchnologies and Cisco Systems SS7 Over IP White Paper," Cisco Systems, Inc. and Agilent and Technologies, pp. 1-6 (Copyright 2002-Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
The attached email dated Oct. 20, 2001 and PowerPoint presentation dated Oct. 24, 2001 disclose an MSISDN-based auto-provisioning solution proposed by a customer of the assignee of the presend application.
"Agilent acceSS7 Business intelligence," Agilent Technologies, pp. 1-6 (Copyright 2001-Printed in the UK Nov. 30, 2001).
"Cisco IP Transfer Point (ITP Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Rockhold, "Or," Wireless Review, p. 22, 23, 26, 28, 30, 32, (Aug. 15, 2000).
Bertrand, "Jambala Mobility Gateway-Convergence and Inter-System Roaming," Ericsson Review, p. 89-93 (1999).
"Topsail Beach-SS7 Over IP-" Cisco Systems, Inc., pp. 1-16 (Copyright 1999).
ETSI, "Digital Cellular Telecommunications Systems (Phase 2+); Support of Mobile Number Portability (MNP); Technical Realisation; Stage 2," Global System for Mobile Communications, p. 1-71, (1998).
Smith, "Number Portability Pileup," Telephony, p. 22, 24, 26, (Jan. 6, 1997).
Jain et al., "Phone Number Portability for PCS Systems with ATM Backbones Using Distributed Dynamic Hashing," IEEE, vol. 15 (No. 1), p. 96-105, (Jan. 1997).

(56) References Cited

OTHER PUBLICATIONS

Heinmiller, "Generic Requrements for SCP Application and GTT Function for Number Portability," Illinois Number Portability Workshop, p. 1-50, (Sep. 4, 1996).
International Telecommunication Union, "Series Q: Switching and Signalling: Specifications of Signalling Systems No. 7-Signalling Connection Control Part," p. 11-16, (Jul. 1996).
Rice, "SS7 Networks in a PCS World," Telephony, pp. 138, 140 142, 144, 146, (Jun. 24, 1996).
Tekelec, "Eagle STP Planning Guide", Eagle Network Switching Division, (No. 3), p. i-vii, 1-64, A1-A2, B1-2, (May 1996).
Anonymous, "Generic Switching and Signaling Requirements for Number Portability," AT&T Network Systems, No. 1, p. 1-75, (Feb. 2, 1996).
ETSI, Digital Cellular Telecommunications System (Phase 2+); Milbe Application Part (MAP) Specification, Global System for Mobile Communications, pp. 112-114 (1996).
Jain, et al., "A Hashing Scheme for Phone Number Portability in PCS Systems with ATM Backbones," Bell Communications Research, p. 593-597, (1996).
Bishop, "Freeing the Network for Competition," Telecommunications, p. 75-80, (Apr. 1995).
Anonymous, "Zeichenabesysteme-Eine neue Generation für ISDN und intelligente Netze," Zeichengabesystem, Medien-Institut Bremen, p. iz-xi; 170-176, (Feb. 17, 1995).
Giordano et al., "PCS Number Portability," IEEE, p. 1146-1150, (Sep. 1994).
Bellcore, "Signaling Transfer Point (STP) Generic Requirements," Bell Communications Research, No. 1, p. ii-xxii, 4-84-J14, (Jun. 1994).
Telcordia Technologies, "CCS Network interface Specification (CCSNIS) Supporting SCCP and TCAP," Bell Communications Research, p. ii-xii, 1-1-C-22, (Mar. 1994).
Buckles, "Very High Capacity Signaling Trnsfer Point for Intelligent Network Servcies," DSC Communciations Corporation, p. 1308-1311, (1988).
"Diameter Overview," referenced from www.ulticom.com/html/products/signalware-diameter-reference-guide.asp (Publication date unknown).
"Chapter 1: Overview," SS7 Port Adapter Installation and Configuration, pp. 1-1-1-8 (Publication Date Unknown).
"Configuring ITP Basic Functionally," IP Transfer Point, Cisco IOS Release 12.2(4)MB12, pp. 31-50 (Publication Date Unknown).
"Configuring ITP Optional Features," IP Transfer Point, Cisco IOS Release 12.294)MB12, pp. 65-136 (Publication Date Unknown).
"Configuring M3UA and SUA SS7 Over IP Signaling Gateways," IP Transfer Point, Cisco IOS Release 12.2(4)MB13, pp. 51-66 (Publication Date Unknown).
"Configuring M3UA and SUA SS7 Over IP Signaling Gateways," IP Transfer Point, Cisco IOS Release 12.2(4)MB10, pp. 49-62 (Publication Date Unknown).
Notification of Transmittal of the International Search Report and the Written Opinion of the International Searching Authority, or the Declaration for International Application No. PCT/US2011/067130 (Jun. 7, 2012).
Non-Final Offcial Action for U.S. Appl. No. 13/035,656 (Jan. 18, 2012).
Commonly-assigned, co-pending U.S. Appl. No. 13/336,132 for "Methods, Systems, and Computer Readable Media for Modifying a Diameter Signaling Message Directed to a Charging Function Node," (Unpublished, filed Dec. 23, 2011).
Commonly-assigned, co-pending International Application No. PCT/US11/67130 for "Methods, Systems, and Computer Readable Media for Modifying a Diameter Signaling Message Directed to a Charging Function Node," (Unpublished, filed Dec. 23, 2011).
U.S. Appl. No. 61/576,213 for "LTE HSS with HLR Proxy Mode for Mobility" (Unpublished, filed Dec. 15, 2011).
Notification of Transmittal of the International Search Report and the Written Opinion of the International Searching Authority, or the Declaration for International Application No. PCT/US2011/026307 (Nov. 15, 2011).
Korhonen et al., "Clarifications on the Routing of Diameter Requests Based on the Username and the Realm," RFC 5729, pp. 1-12 (Dec. 2009).
Korhonen et al., "Diameter User-Name and Realm Based Request Routing Clarifications," draft-ietf-dime-nai-routing-04.txt, pp. 1-13 (Oct. 6, 2009).
"3rd Generation Partnership Project; Technical Specifications Group Service and System Aspects; Telecommunication management; Charging management; Diameter charging applications (Release 7)," 3GPP TS 32.299, V7.7.0, pp. 1-120 (Sep. 2007).
Non-Final Office Action for U.S. Appl. No. 13/035,656 (Oct. 9, 2013).
Communication of European publication number and information on the application of Article 67(3) EPC for European Application No. 11852129.3 (Oct. 2, 2013).
Notice of Allowance and Fee(s) Due for U.S. Appl. No. 13/336,132 (Sep. 23, 2013).
Second Examination Report for Indian Application No. 3231/CHENP/2008 (Aug. 6, 2013).
Applicant-Initiated Interview Summary for U.S. Appl. No. 13/035,656 (May 17, 2013).
Notice of Allowance and Fee(s) Due for U.S. Appl. No. 13/035,656 (Jan. 31, 2014).
Applicant-Initiated Interview Summary for U.S. Appl. No. 13/035,656 (Jan. 14, 2014).
Notice of Allowance and Fee(s) Due for U.S. Appl. No. 13/752,369 (Jun. 10, 2014).
Chinese Office Action for Chinese Patent Application No. 200680051295.9 (Mar. 20, 2012).
Chinese Office Action for Chinese Patent Application No. 200680051295.9 (Oct. 9, 2011).
Non-Final Office Action for U.S. Appl. No. 13/714,360 (Sep. 2, 2014).

* cited by examiner

METHODS, SYSTEMS, AND COMPUTER READABLE MEDIA FOR PROVIDING HOME SUBSCRIBER SERVER (HSS) PROXY

PRIORITY CLAIM

This application claims the benefit of U.S. Provisional Patent Application Ser. No. 61/163,435, filed Mar. 25, 2009; the disclosure of which is incorporated herein by reference in its entirety.

TECHNICAL FIELD

The subject matter described herein relates to methods and systems for managing mobile subscribers in a wireless telecommunications network. More particularly, the subject matter described herein relates to systems, methods, and computer readable media for providing a home subscriber server (HSS) proxy.

BACKGROUND

In telecommunications networks that support mobile subscribers, there is a need to know or determine the current location of mobile subscribers so that calls, emails, short message service messages, or other data may be communicated to those mobile subscribers. In mobile telephone networks, there are network entities, usually servers, which maintain that information. These network entities may receive queries for the current location of a particular mobile subscriber, and may reply with the current or last known location of the mobile subscriber. The location is typically given in the form of the network address or ID of a switch, such as a mobile switching center (MSC), that is currently serving the mobile subscriber.

In second-generation (2G) telecommunications networks, the entity that manages this information is called a home location register, or HLR. In third-generation (3G) telecommunications networks, the entity that manages this information is called a home subscriber server, or HSS. Networks that use the session initiation protocol (SIP), such as Internet protocol multimedia subsystem (IMS) networks, also include an HSS.

FIG. 1 is a block diagram illustrating an IMS network. Network 100 includes an interrogation call session control function node, I-CSCF 102, which processes SIP messages and routes subscriber-related messages to the correct serving call session control function node, or S-CSCF. Network 100 has four S-CSCF nodes, 104A, 104B, 104C, and 104D, which hereinafter may be collectively referred to as S-CSCFs 104. Each S-CSCF 104 serves a subset of the subscribers within network 100. S-CSCFs 104 provide services for the subscribers, such as setting up media communication sessions between subscribers and applications.

Network 100 also includes an HSS 106, which contains subscription-related information, such as user profiles, performs authentication and authorization of subscribers, and can provide information about the physical location of the subscriber.

In the network illustrated in FIG. 1, I-CSCF 102 receives a SIP INVITE message 108. SIP INVITE message 108 may request a communication session with a particular subscriber, herein referred to as the called party, or CDP. To determine the current location of called party subscriber CDP, I-CSCF 102 queries HSS 106 by sending a Diameter protocol location information request (LIR) 110. HSS 106 responds with a Diameter location information answer (LIA) 112, which identifies the switch that is currently serving called party subscriber CDP. In the example illustrated in FIG. 1, HSS 106 may indicate to I-CSCF 102 that called party subscriber CDP is currently served by S-CSCF 104C, in which case I-CSCF 102 will forward the SIP INVITE message to S-CSCF 104C, shown as SIP INVITE message 114.

As the number of subscribers in a network increase, however, it may be necessary to distribute the HSS functions across more than one HSS node. FIG. 2 shows an example of such a network configuration.

FIG. 2 is a block diagram illustrating an IMS network having multiple HSS nodes. IMS network 200 includes an I-CSCF 202 for processing SIP messages and routing subscriber-related messages to the appropriate switch, such as S-CSCF nodes 204A and 204B, which hereinafter may be collectively referred to as switches 204 or C-CSCFs 204.

Network 200, however, includes multiple HSS nodes, HSS1 206A and HSS2 206B, which hereinafter may be collectively referred to as HSS nodes 206, across which is distributed subscriber information. In order for I-CSCF 202 to determine which HSS node 206 to query, network 200 includes a subscriber location function node (SLF) 208. In the network illustrated in FIG. 2, SLF 208 maintains an SLF table 210 for mapping subscribers to HSS nodes. SLF table 210 contains multiple rows, each row representing an entry in the table. Each entry maps a subscriber ID, shown in the left column of each row, to an HSS ID, shown in the right column of each row. In the example SLF table 210 illustrated in FIG. 2, a subscriber identified as "Fred@AOL.com" is mapped to HSS1 206A. Thus, if I-CSCF 202 needs to determine the location of Fred@AOL.com, it will first query SLF 208 to determine the appropriate HSS node 206, and then query the appropriate HSS node 206 to determine the identify of the switch that is serving Fred@AOL.com.

In the network illustrated in FIG. 2, I-CSCF 202 receives a SIP INVITE message 212 requesting a session with subscriber "Jenny@VZW.com". To determine the current location of Jenny@VZW.com, I-CSCF 202 first queries SLF 208 to determine which HSS node 206 maintains location information for Jenny@VZW.com. I-CSCF 202 sends a Diameter location information request 214 to SLF 208, requesting location information for Jenny@VZW.com. SLF 208 responds with a Diameter redirect message 216, which instructs I-CSCF to redirect its LIR query to HSS2 206B. I-CSCF again issues a Diameter LIR query 218, this time to HSS2 206B, which issues a Diameter LIA response 220 back to I-CSCF 202. In the example illustrated in FIG. 2, HSS2 206B informs I-CSCF 202 that Jenny@VZW.com is being served by S-CSCF 204B. I-CSCF 202 forwards the SIP INVITE message, shown as SIP INVITE message 222, to S-CSCF 204B.

FIG. 3 is a block diagram illustrating an IMS network 300 having multiple HSS nodes. The functions of I-CSCF 202, S-CSCFs 204A and 204B, HSS nodes 206A and 206B, SLF 208, and SLF table 210 are essentially identical to their like-numbered counterparts in FIG. 2, and therefore descriptions of their functions will not be repeated here, with the exception of SLF 208. In network 300, SLF 208 does not redirect a Diameter LIR query but instead routes it to the appropriate HSS node 206 on behalf of I-CSCF 202.

Thus, in the network illustrated in FIG. 3, I-CSCF 202 receives a SIP INVITE message 302 requesting a session with subscriber "Jenny@VZW.com". To determine the current location of Jenny@VZW.com, I-CSCF 202 first queries SLF 208 to determine which HSS node 206 maintains location information for Jenny@VZW.com. I-CSCF 202 sends a Diameter location information request 304 to SLF 208, requesting location information for Jenny@VZW.com. SLF 208 refers to SLF table 210 to determine that location information for Jenny@VZW.com is maintained at HSS2 206B, and sends or relays Diameter location information request 306 to HSS2 206B. HSS2 206B responds with a Diameter location information answer 308, which SLF 208 receives and forwards to I-CSCF 202. From Diameter location answer 208, I-CSCF 202 is informed that Jenny@VZW.com is being served by S-CSCF 204B. I-CSCF 202 forwards the SIP INVITE message, shown as SIP INVITE message 310, to S-CSCF 204B.

The networks illustrated in FIGS. 2 and 3, however, have no means to handle the situation where a mobile subscriber has been ported. FIG. 4 shows an example of a network that attempts to correct this disadvantage.

FIG. 4 is a block diagram illustrating another IMS network 400 having multiple HSS nodes. The functions of I-CSCF 202, S-CSCFs 204A and 204B, HSS node 206A, and SLF 208 are essentially identical to their like-numbered counterparts in FIG. 2, and therefore descriptions of their functions will not be repeated here, with the exception of SLF 208, which will be described in more detail below.

Network 400 includes a number portability database 402 for storing number portability information for subscribers. In the network illustrated in FIG. 4, I-CSCF 202 receives a SIP INVITE message 404 requesting a session with subscriber "9195551234". To determine the current location of subscriber 9195551234, I-CSCF 202 sends a Diameter location information request 406 to SLF 208. SLF 208 may first check to see if subscriber 9195551234 has been assigned a new subscriber ID, by sending a subscriber ID map query (SMQ) 408 to, and receiving a subscriber ID map answer (SMA) 410 from, subscriber ID mapping database (SMDB) 402. If subscriber 9195551234 has been assigned a new subscriber ID, SMA 410 contains the new identifier allocated to subscriber 9195551234. SLF 208 then determines the HSS that serves the subscriber, and sends to I-CSCF 202 a Diameter redirect message 412 instructing I-CSCF 202 to redirect its Diameter location information request to an HSS node in the recipient network, such as HSS3 414.

In response to receiving Diameter redirect message 412, I-CSCF 202 issues Diameter location information request 416 to HSS3 414. HSS3 414 responds to I-CSCF 202 with a Diameter location information answer 418. From Diameter location information answer 418, I-CSCF 202 is instructed to forward the SIP INVITE message to a switch in the recipient network, SW_X 420. I-CSCF 202 forwards the SIP INVITE message, shown as SIP INVITE message 422, to recipient network switch SW_X 420.

There are disadvantages associated with the networks illustrated in FIGS. 1 through 4. Network 100 does not contain multiple HSS nodes. Network 200 contains multiple HSS nodes, but requires the I-CSCF to make two queries: one to determine the correct HSS node, and the second to get information from the correct HSS node. Network 300 allows the I-CSCF to make one query, but has no means to deal with ported subscribers. Network 400 checks for ported subscribers, but again forces the I-CSCF to make two queries: if the subscriber is ported, the SLF instructs the I-CSCF to ask another HSS for information.

Another issue involves technology migration, such as where a subscriber has migrated from one network standard or protocol to another network standard or protocol. For example, in mixed 2G/3G/SIP/IMS networks, what was formerly a 2G subscriber may upgrade to a 3G device or want to access the network using a SIP-capable terminal. This may happen because a subscriber has changed network service providers (and is also likely to be a number portability candidate), but this may also happen as a network provider supports more, different, or better telecommunications standards. In a technology migration scenario, a subscriber whose information was formerly maintained by an HLR, for example, may now have that information maintained at an HSS. The networks described above have no means to check for this scenario.

Accordingly, in light of these potential disadvantages, there exists a need for methods, systems, and computer readable media for providing a home subscriber server (HSS) proxy.

SUMMARY

Methods, systems, and computer readable media for providing a HSS proxy are disclosed. According to one aspect, the subject matter described herein includes a method for providing a home subscriber server proxy. The method includes, at a node separate from a home subscriber server in a telecommunications network, receiving, from a requesting network entity, a request for information maintained at a home subscriber server, the information being associated with a subscriber, and, in response to receiving the request for information maintained at a home subscriber server, providing the information associated with the subscriber to the requesting network entity on behalf of the home subscriber server.

According to yet another aspect, the subject matter described herein includes a system for providing a home subscriber server proxy. The system includes at least one database that includes number portability information, technology migration information, and information maintained at a home subscriber server; and a home subscriber server proxy node for receiving, from a requesting network entity, a request for information maintained at a home subscriber server, the information being associated with a subscriber, and, in response to receiving the request for information maintained at a home subscriber server, providing the information associated with the subscriber to the requesting network entity on behalf of the home subscriber server.

The subject matter described herein for providing a home subscriber server proxy may be implemented in hardware, software, firmware, or any combination thereof. As such, the terms "entity" or "module" as used herein refer to hardware for implementing the feature being described, and may additionally include software and/or firmware. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

The subject matter described herein relates to methods, systems, and computer readable medium for providing an HSS proxy. Reference will now be made in detail to exemplary embodiments of the presently disclosed subject matter, examples of which are illustrated in the accompanying drawings. Wherever possible, the same reference numbers will be used throughout the drawings to refer to the same or like parts.

Figure 1:
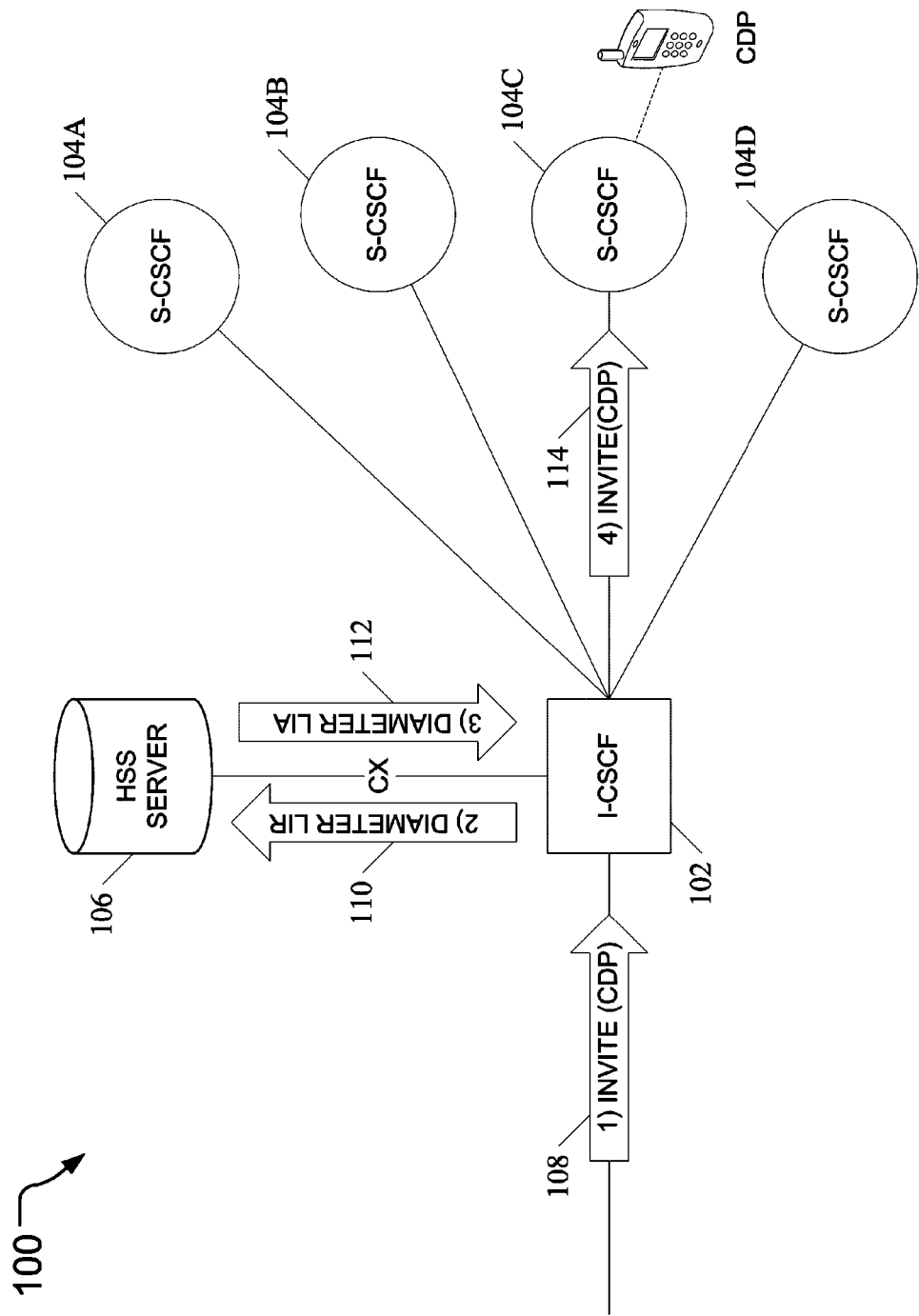
FIG. 1 is a block diagram illustrating an IMS network.
Figure 2:
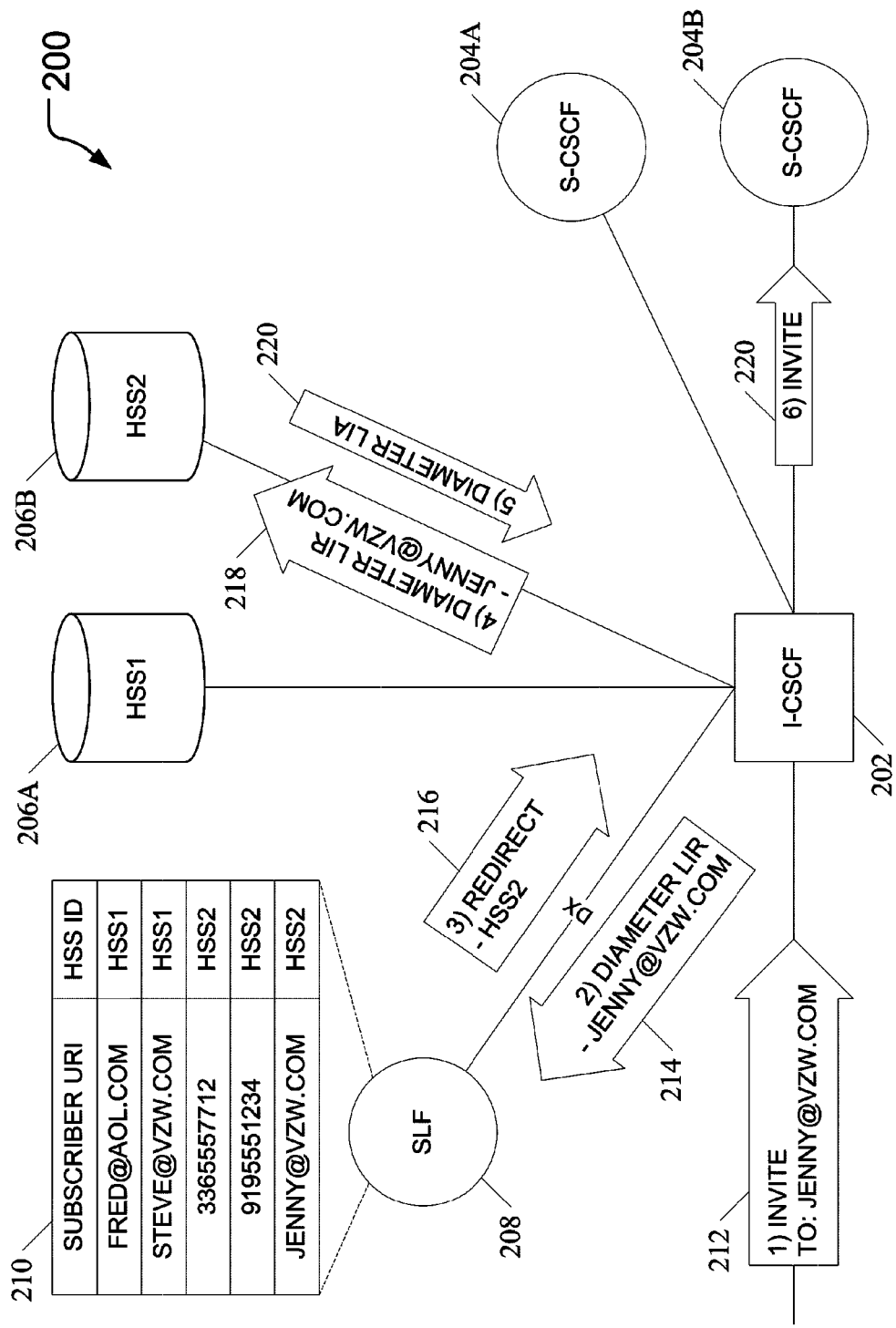
FIG. 2 is a block diagram illustrating an IMS network having multiple HSS nodes.
Figure 3:
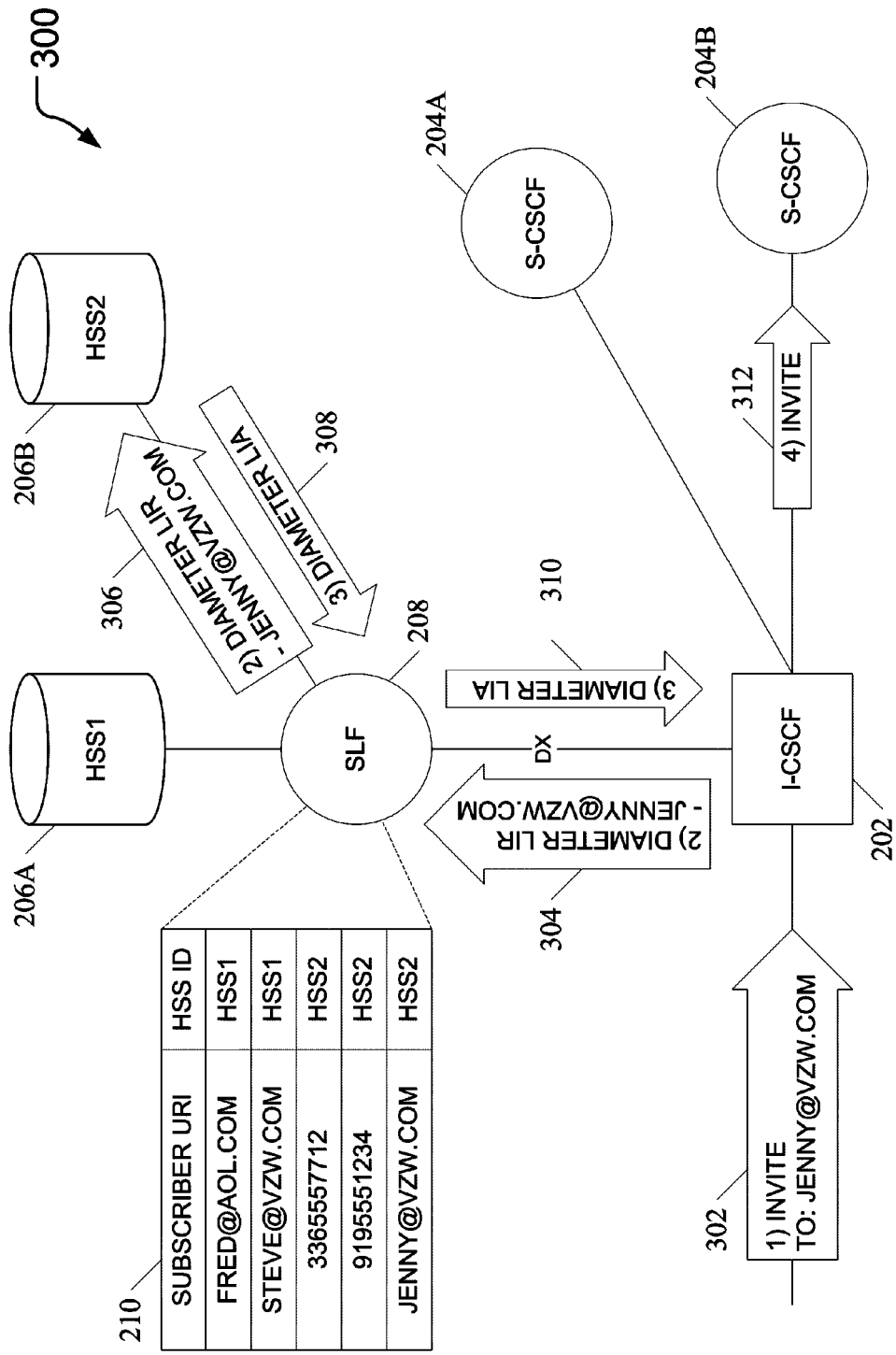
FIG. 3 is a block diagram illustrating an IMS network having multiple HSS nodes.
Figure 4:
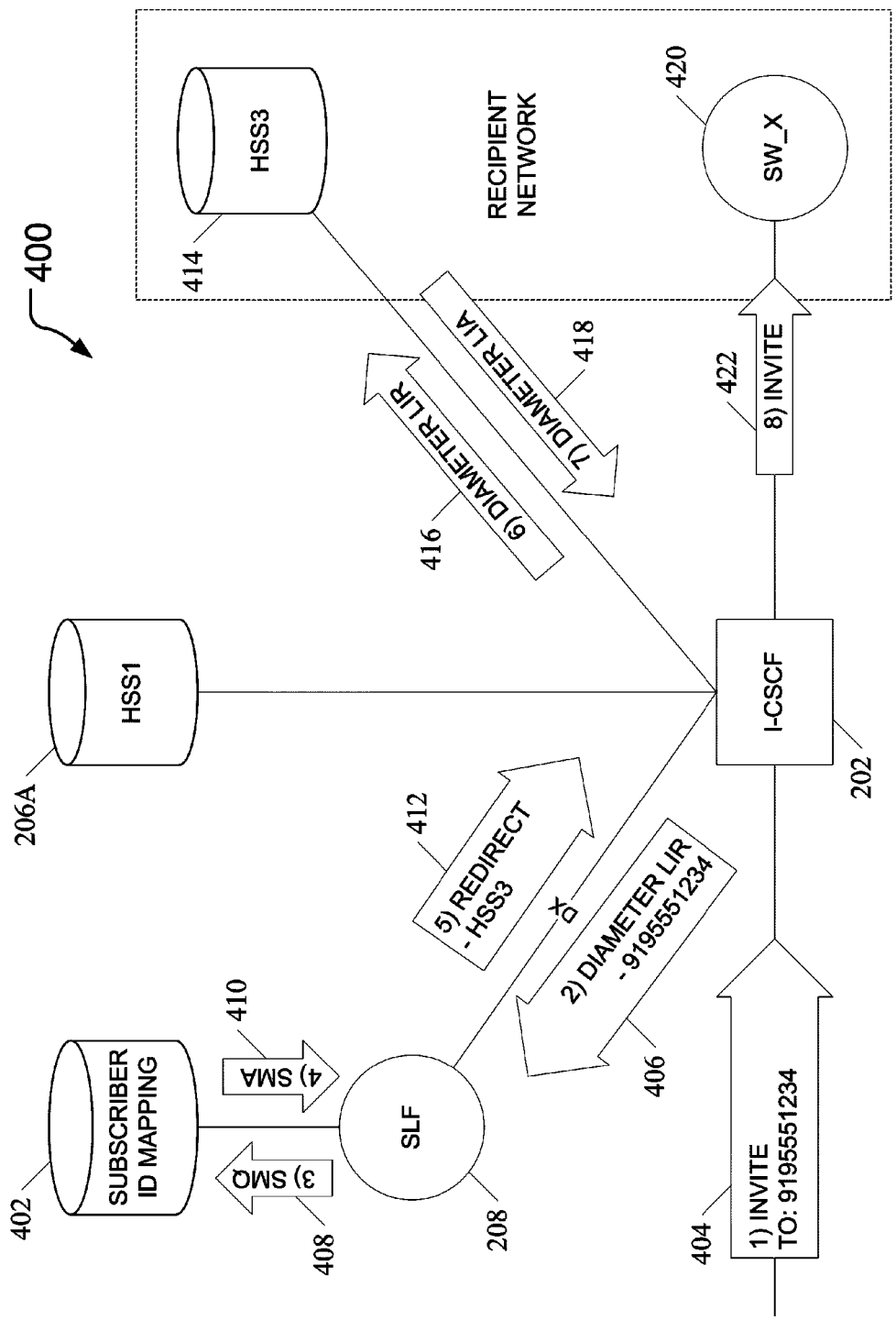
FIG. 4 is a block diagram illustrating an IMS network having multiple HSS nodes.
Figure 5:
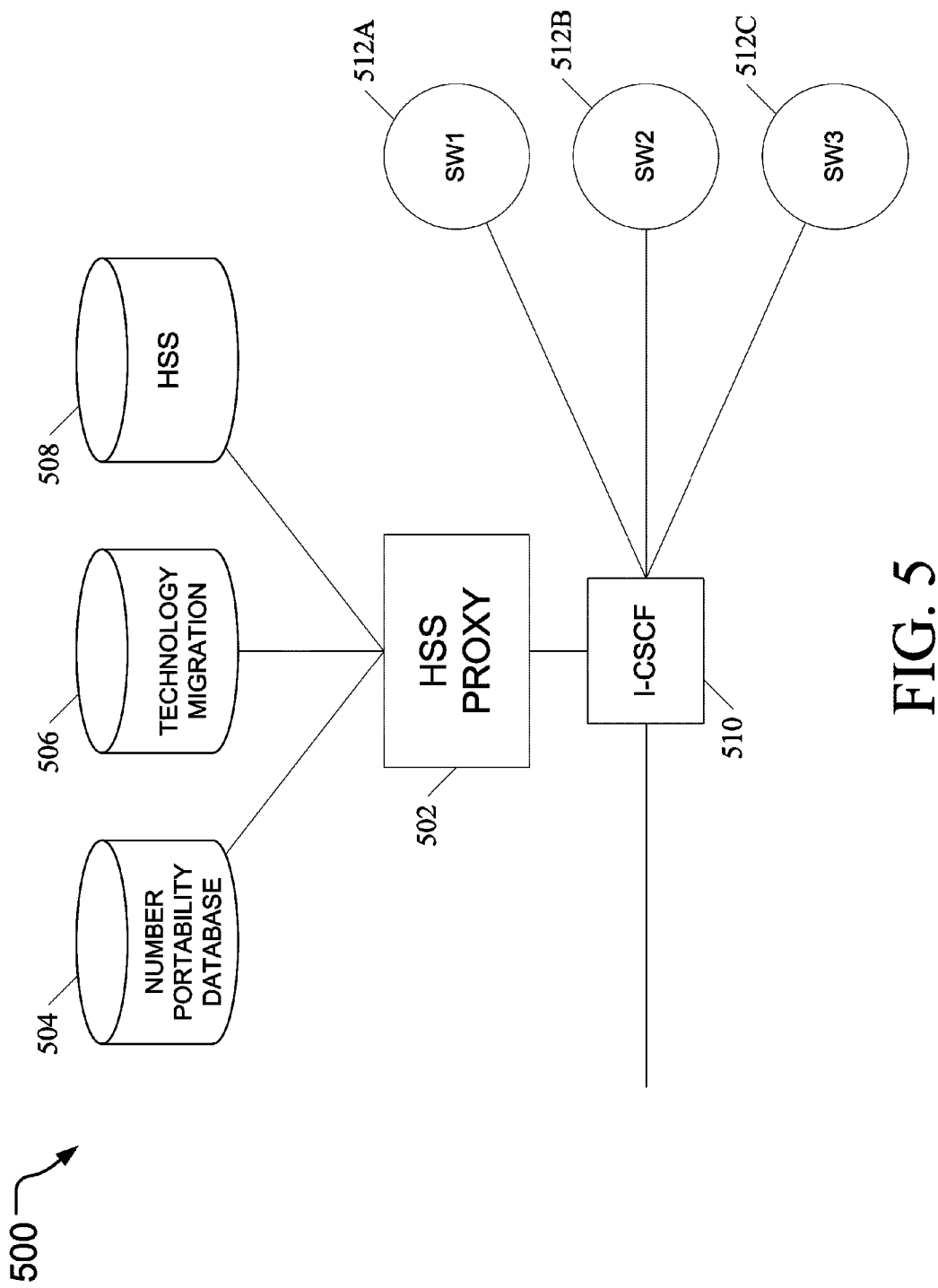
FIG. 5 is a block diagram illustrating an exemplary system for providing a home subscriber server proxy according to an embodiment of the subject matter described herein.

FIG. 5 is a block diagram illustrating an exemplary system for providing a home subscriber server proxy according to an embodiment of the subject matter described herein. Telecommunications network 500 includes a home subscriber server proxy, HSS proxy 502, for receiving, from a requesting network entity, a request for information maintained at a home subscriber server, the information being associated with a subscriber. In response to receiving the request for information maintained at a home subscriber server, HSS proxy 502 provides the information associated with the subscriber to the requesting network entity on behalf of the home subscriber server.

In one embodiment, providing the information associated with the subscriber to the requesting network entity on behalf of the home subscriber server may include determining whether the subscriber has been ported to a recipient network, and if so, responding to the requesting network entity with information identifying a switch that is associated with the recipient network.

In one embodiment, providing the information associated with the subscriber to the requesting network entity on behalf of the home subscriber server may include determining whether the subscriber has been migrated to a different technology, and if so, responding to the requesting network entity with information identifying a switch that is associated with the migrated-to technology.

In one embodiment, providing the information associated with the subscriber to the requesting network entity on behalf of the home subscriber server may include determining that the subscriber has not been ported to a recipient network or migrated to a different technology; in this instance, HSS proxy 502 may query a home subscriber server and send the result to the requesting network entity.

In the embodiment illustrated in FIG. 5, in response to receiving the subscriber location information request, HSS proxy 502 accesses one or more of a number portability database 504, a technology migration database 506, and a or location information database, such as home subscriber server (HSS) 508, to determine the subscriber location information, which HSS proxy 502 communicates to the entity that requested the location information.

HSS proxy 502 may receive subscriber location information requests from entities within network 500 that process signaling messages that are associated with a mobile subscriber. In the embodiment illustrated in FIG. 5, HSS proxy 502 may receive subscriber location information requests from a call session control function (CSCF) node, such as I-CSCF node 510. Example requests include Diameter protocol messages, such as the Diameter location information request (LIR).

HSS proxy 502 responds to the subscriber location information request by sending the subscriber location information to the requesting entity. Example responses include Diameter protocol messages, such as the Diameter location information answer (LIA). As will be described in more detail in FIGS. 10 and 11, below, other message protocols may be used.

The location information provided by HSS proxy 502 may include the address or other identifier, such as a location routing number (LRN), a point code address, a uniform resource identifier (URI), an Internet protocol address, etc., of a node in the network that is currently serving the mobile subscriber or to which call setup messages, such as SIP INVITE messages, should be directed for the purpose of setting up a call with the mobile subscriber. In the embodiment illustrated in FIG. 5, network 500 includes three switches, SW1 512A, SW2 512B, and SW3 512C.

In one embodiment, technology migration database 506 includes current technology registration information for dual mode subscribers and where HSS proxy 502 accesses the current technology registration information to determine a technology or network type (e.g., Internet protocol multimedia subsystem (IMS), long term evolution (LTE), global system for mobile communications (GSM), session initiation protocol (SIP), signaling system 7 (SS7), public switched telephone network (PSTN), etc.), for which the subscriber is currently registered.

In one embodiment, HSS proxy 502 and one or more of one or more of number portability database 504, technology migration database 506, and HSS 508 are components of a signal routing node, such as a SIP router.

In the embodiment illustrated in FIG. 5, HSS proxy 502 may perform separate queries to each of number portability database 504, technology migration database 506, and HSS 508 in order to get the information associated with the subscriber. In an alternative embodiment, the number portability information, the technology migration information, and the HSS location information may be present in the same database accessible by HSS proxy 502 in a single lookup. In one embodiment, HSS proxy 502 have access to a single database, referred to herein as a HSS proxy database, that includes all of the information necessary to process a Diameter query for which HSS or HLR access is required. Table 1, below illustrates an example of information that may be included in an HSS proxy database according to an embodiment of the subject matter described herein.

TABLE 1

Exemplary HSS Proxy Database

| Directory Number | In or Out | Technology Migration | HSS or HLR Address | LRN/ Routing Digits | Current Technology Registration |
|---|---|---|---|---|---|
| $DN_1$ | IN | LTE | $IP_1$ | $Prefix_1$ | |
| $DN_2$ | IN | 3G-GSM | $PC_1$ | $Prefix_2$ | |
| $DN_3$ | Out | | | LRN | |
| $DN_4$ | IN | 3G-IS-41 | $PC_2$ | $Prefix_3$ | |
| $DN_5$ | IN | 3G-GSM and LTE | $IP_2, PC_1$ | $Prefix_4$ | LTE |

In Table 1, the first column contains directory numbers (DNs) that HSS proxy 502 may compare to directory numbers from received DIAMETER messages.

The second column in the table indicates whether the subscriber is an in-network subscriber or whether the subscriber has been ported out. As indicated by the third row in the table, if the subscriber has been ported out, the only remaining data in the table is the location routing number (LRN) that corresponds to the network to which the subscriber has been ported. If the subscriber is an in-network subscriber, technology migration, HSS or HLR address, routing digits, and current technology registration information may be present.

The third column in the table includes technology migration information, which indicates the type of handset that the subscriber is using. In the illustrated example, the technology types that are listed are long term evolution (LTE), 3G-GSM, 3G-IS-41, and 3G-GSM/LTE for a dual mode subscriber.

The fourth column in the table includes the HSS or HLR address for in-network subscribers. For LTE technology subscribers, the address will be an IP address or domain name of an HSS that is currently serving the subscriber. This information may be important because a network operator may have several HSSs in its network and thus the HSS proxy database may include the IP address of the particular HSS serving the subscriber.

The fifth column in the table includes LRNs for ported out subscribers and prefixes for in-network subscribers.

The sixth column of the table includes current technology registration information for dual mode subscribers. For example, in the last row of the table, the subscriber is a dual mode GSM/LTE subscriber and is currently registered as an LTE subscriber. It should also be noted that for this subscriber, there are two entries in the HSS or HLR address column, an IP address, $IP_2$, for the HSS containing information for the subscriber's LTE registration and an HLR address point $code_1$ ($PC_1$) for the HLR containing the subscriber's 3G-GSM information. HSS proxy 502 would return either the point code or the IP address depending on whether the subscriber is currently registered as an LTE or GSM.

In one embodiment, HSS proxy 502 may perform the lookups or information accesses in the HSS proxy database in the following sequence:

1. First, perform a number portability lookup, and if the subscriber is ported out, return the LRN without doing further lookups or checks for information.
2. After the number portability lookup, perform the technology migration lookup to determine the current technology of the subscriber's handset.
3. If dual mode registration is supported, perform the current technology registration lookup to determine the technology type for which the subscriber is currently registered.
4. Perform the HSS or HLR address lookup to determine the address of the HSS or the HLR that contains the subscriber's information.

Figure 6:
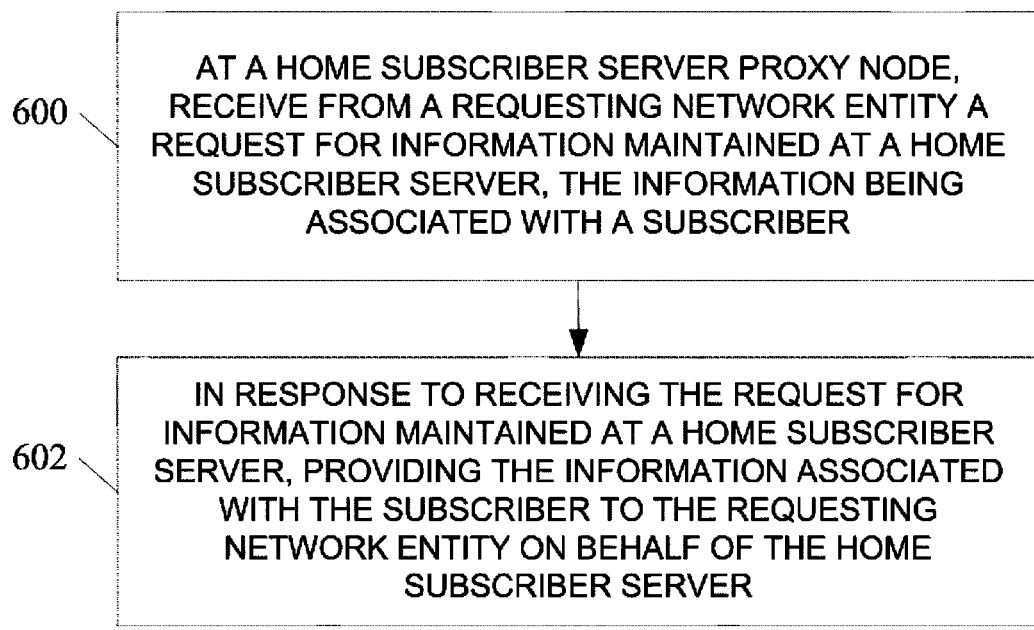
FIG. 6 is a flow chart illustrating an exemplary process for providing a home subscriber server proxy according to an embodiment of the subject matter described herein.

FIG. 6 is a flow chart illustrating an exemplary process for a home subscriber server proxy according to an embodiment of the subject matter described herein. This process will now be described in reference to FIGS. 5 and 6.

At block 600, a home subscriber server proxy node receives, from a requesting network entity, a request for subscriber information maintained at a home subscriber server, the information being associated with a subscriber. For example, in the embodiment illustrated in FIG. 5, HSS proxy 502 may receive a SIP INVITE from I-CSCF 510, where the SIP INVITE identifies a called party subscriber.

At block 602, in response to receiving the request for information maintained at a home subscriber server, the home subscriber server proxy node provides the information associated with the subscriber to the requesting network entity on behalf of the home subscriber server.

Figure 7:
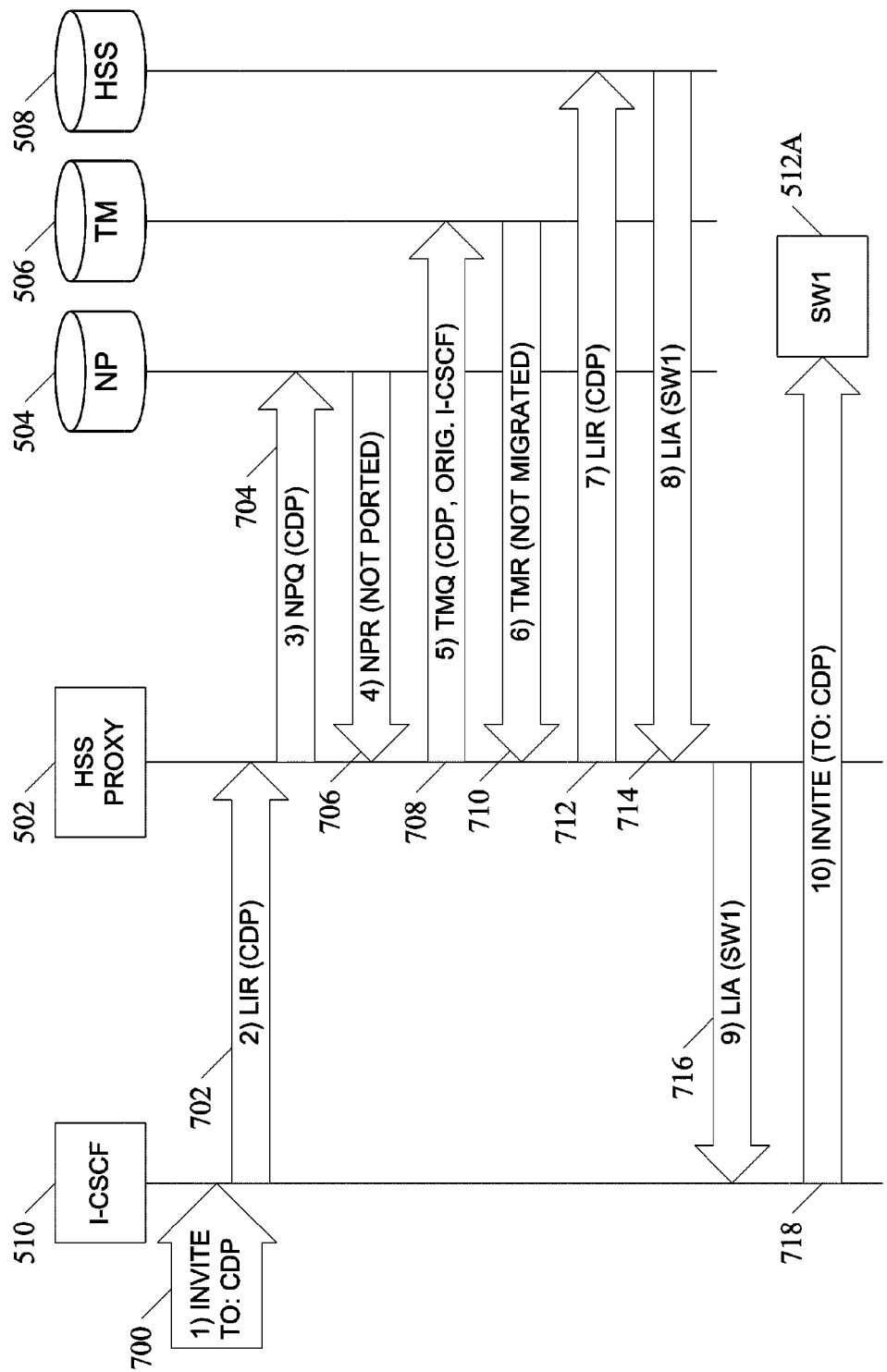
FIG. 7 is an exemplary call flow diagram illustrating signaling messages exchanged during an exemplary process for providing a home subscriber server proxy according to an embodiment of the subject matter described herein, where an IMS subscriber is not ported or migrated to a different technology.
Figure 8:
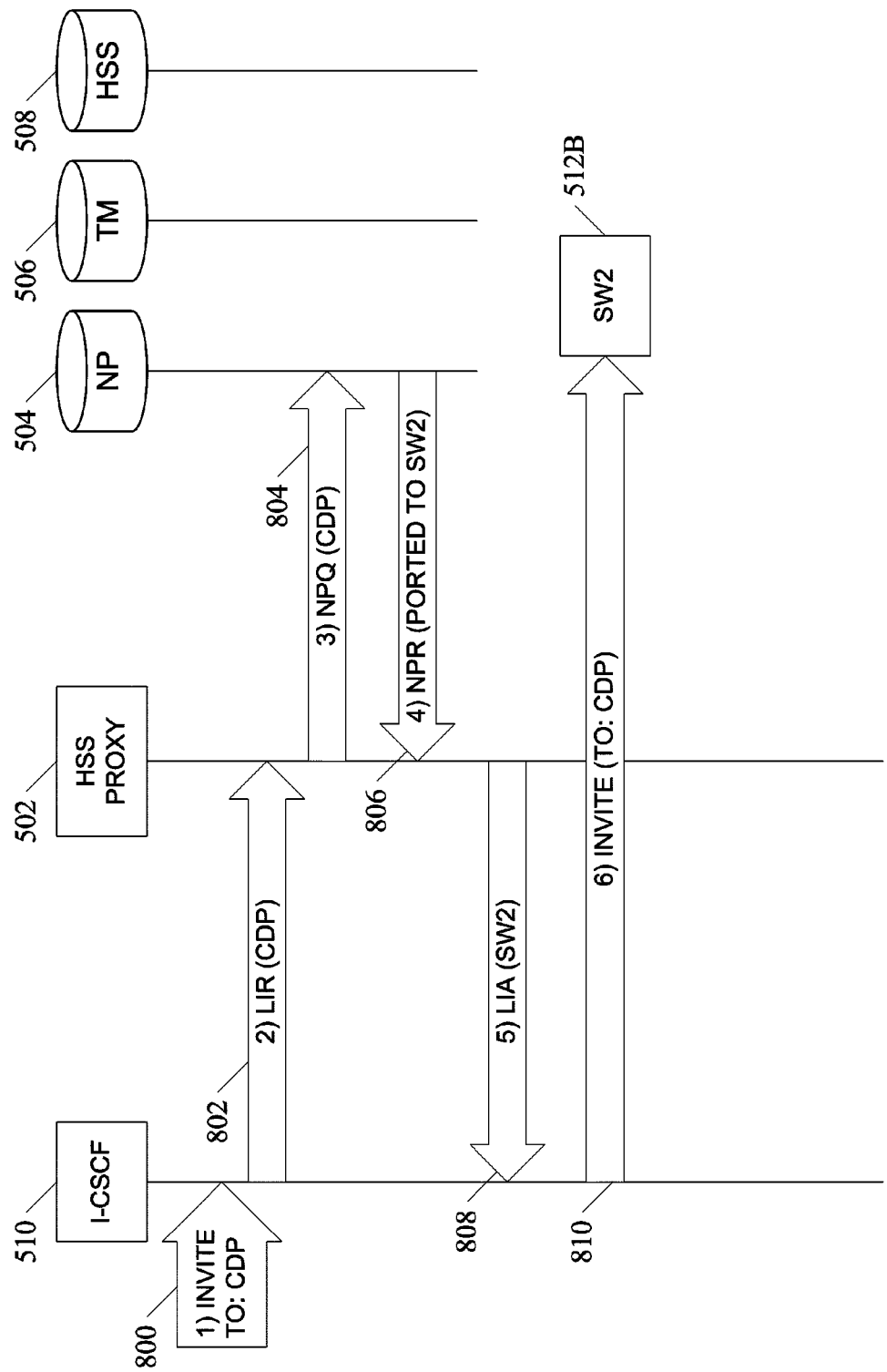
FIG. 8 is an exemplary call flow diagram illustrating signaling messages exchanged during an exemplary process for providing a home subscriber server proxy according to an embodiment of the subject matter described herein, where an IMS subscriber is ported.
Figure 9:
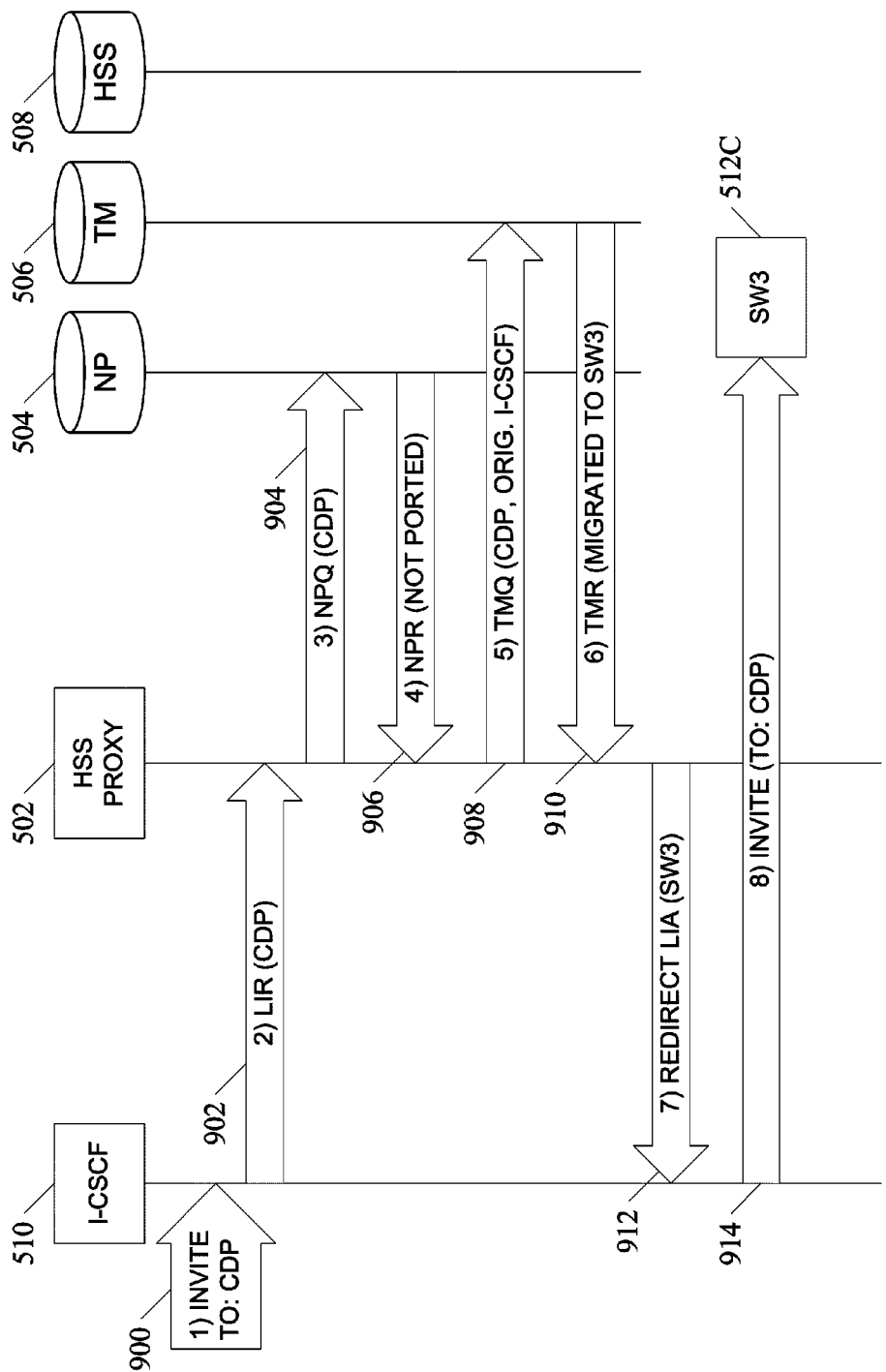
FIG. 9 is an exemplary call flow diagram illustrating signaling messages exchanged during an exemplary process for providing a home subscriber server proxy according to an embodiment of the subject matter described herein, where an IMS subscriber is not ported but is migrated to a different technology.

The operation of a network according to an embodiment of the subject matter described herein is described in FIGS. 7 through 9, which illustrate in detail exemplary signaling messages that are communicated among the various network elements. These messages are described below.

FIG. 7 is an exemplary call flow diagram illustrating signaling messages exchanged during an exemplary process for providing a home subscriber server proxy according to an embodiment of the subject matter described herein, where an IMS subscriber is not ported or migrated to a different technology. In FIG. 7, I-CSCF 510 receives a SIP INVITE message 700 that identifies a called party, CDP. I-CSCF 510 issues a Diameter location information request (LIR) message 702 to HSS proxy 502. LIR message 702 requests location information for subscriber CDP. HSS proxy 502 first determines whether the subscriber is in-network or out of network by sending a number portability query 704 to number portability database 504 and receiving number portability reply 706 indicating that the subscriber is not ported.

HSS proxy 502 then issues a technology migration query 708 to technology migration database 506 to determine whether the subscriber has been migrated to a different technology. In the embodiment illustrated in FIG. 7, technology migration database 506 sends a technology migration response 710 that indicates that the subscriber has not been migrated to a different technology.

HSS proxy 502 then issues LIR 712 to HSS 508. HSS 508 replies with LIA 714, which contains information identifying the switch that is currently serving the subscriber, e.g., SW1 512A. HSS proxy 502 communicates the identity of SW1 512A to the requesting network entity I-CSCF 510, e.g., via LIA 716. I-CSCF 510 uses this information and sends a SIP INVITE message 718 to the identified serving switch SW1 512A. In one embodiment, HSS proxy 502 terminates LIA response 714 and generates a new LIA message 716. In another embodiment, HSS proxy 502 receives the LIA response from HSS 508. In yet another embodiment, HSS 508 sends an LIA response directly to the requesting network entity, e.g., I-CSCF 510.

According to one aspect of the subject matter described herein, HSS proxy 502 may correlate between TCP connections used by I-CSCF 510 and SCTP associations used by HSS 508 (and other HSS nodes in the network.) For example, HSS proxy 502 may establish TCP connections with I-CSCFs with which it communicates and establish SCTP associations with HSSs with which it communicates. When a diameter query from an I-CSCF arrives on one of the TCP connections, and the subscriber is not ported and not migrated, HSS proxy 502 may identify the SCTP association associated with the destination HSS and forward the query to the HSS (or terminate the query and send a new query to the HSS). HSS proxy 502 may correlate the outbound SCTP association with the inbound TCP connection based on the path taken by the received diameter query. When the diameter response is received from the HSS over the SCTP association, HSS proxy 502 may send the response to over the inbound TCP connection that is correlated with the SCTP association using the stored correlation information.

FIG. 8 is an exemplary call flow diagram illustrating signaling messages exchanged during an exemplary process for providing a home subscriber server proxy according to an embodiment of the subject matter described herein, where an IMS subscriber is ported.

In FIG. 8, I-CSCF 510 receives a SIP INVITE message 800 that identifies a called party, CDP. I-CSCF 510 issues a Diameter location information request (LIR) message 802 to HSS proxy 502, requesting location information for subscriber CDP. HSS proxy 502 first determines whether the subscriber is in-network or out of network by sending a number portability query 804 to number portability database 504 and receiving number portability reply 806 indicating that the subscriber has been ported, and identifies the switch in the recipient network to which a SIP INVITE message should be sent, e.g., SW2 512B. HSS proxy 502 communicates the identity of SW2 512B to the requesting network entity I-CSCF 510, e.g., via LIA 808. I-CSCF 510 uses this information and sends a SIP INVITE message 810 to the identified serving switch SW2 512B.

FIG. 9 is an exemplary call flow diagram illustrating signaling messages exchanged during an exemplary process for providing a home subscriber server proxy according to an embodiment of the subject matter described herein, where an IMS subscriber is not ported but is migrated to a different technology.

In FIG. 9, I-CSCF 510 receives a SIP INVITE message 900 that identifies a called party, CDP. I-CSCF 510 issues a Diameter location information request (LIR) message 902 to HSS proxy 502, requesting location information for subscriber CDP. HSS proxy 502 first determines whether the subscriber is in-network or out of network by sending a number portability query 904 to number portability database 504 and receiving number portability reply 906 indicating that the subscriber is not ported.

HSS proxy 502 then issues a technology migration query 908 to technology migration database 506 to determine whether the subscriber has been migrated to a different technology. In the embodiment illustrated in FIG. 9, technology migration database 506 sends to HSS proxy 502 a technology migration response 910 that indicates that the subscriber has been migrated to a different technology, and identifies a serving switch having the appropriate network technology, e.g., SW3 512C. HSS proxy 502 communicates the identity of SW3 512C to the requesting network entity I-CSCF 510, e.g., via LIA 912. I-CSCF 510 uses this information and sends a SIP INVITE message 914 to the identified serving switch SW3 512C.

Although FIGS. 7, 8, and 9 show HSS proxy 502 receiving a Diameter LIR message and responding with a Diameter LIA message, other Diameter request/answer messages may be similarly treated, including but not limited to: user authorization request (UAR) and user authorization answer (UAA); user data request (UDR) and user data answer (UDA); and media authorization request (MAR) and media authorization answer (MAA).

Likewise, the subject matter described herein is not limited to IMS networks but may also be applied to other types of networks, as shown in FIGS. 10 through 13, described below.

Figure 10:
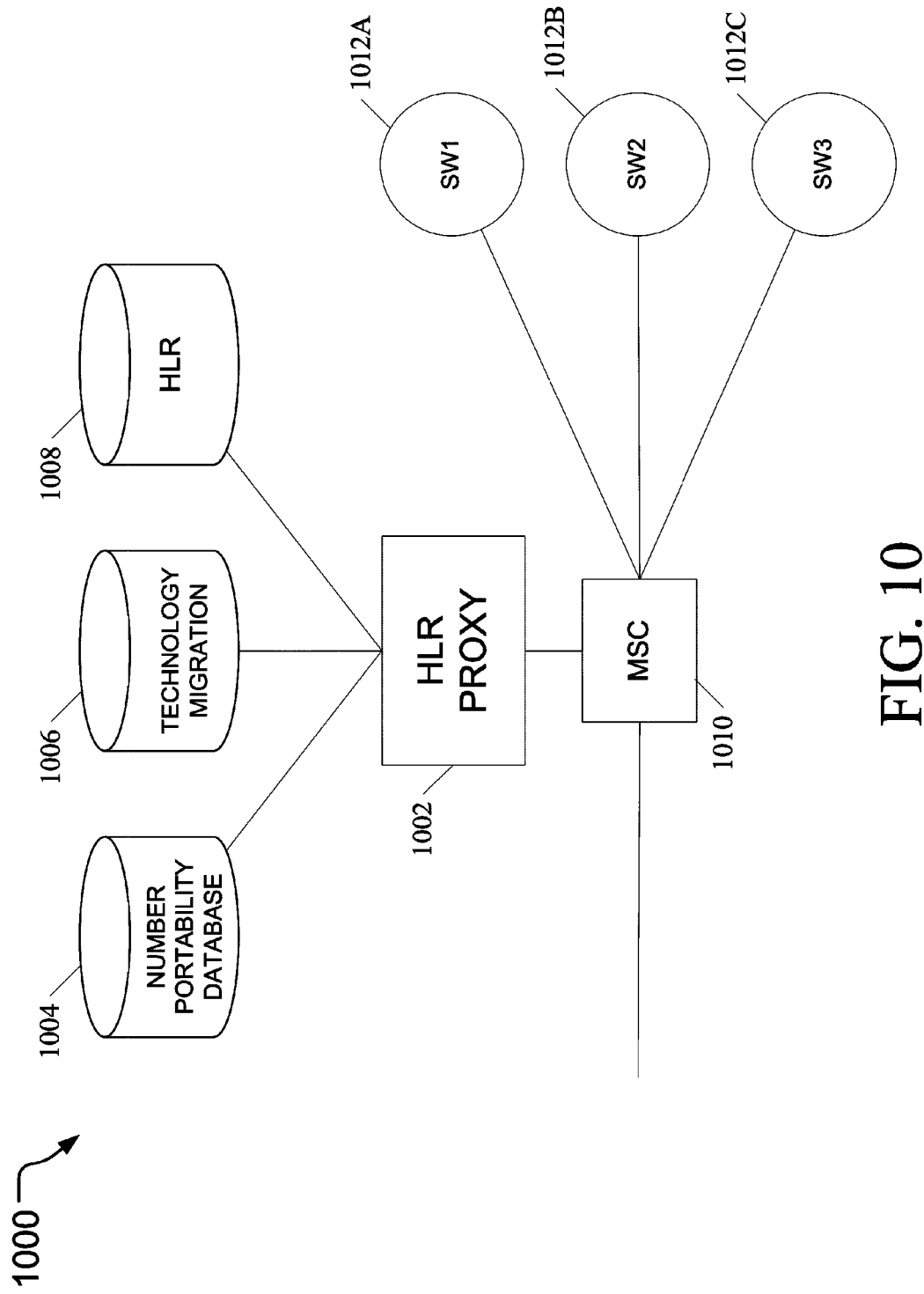
FIG. 10 is a block diagram illustrating an exemplary system for providing a home location register proxy according to an embodiment of the subject matter described herein.

FIG. 10 is a block diagram illustrating an exemplary system for providing a home location register proxy according to an embodiment of the subject matter described herein. Telecommunications network 1000 includes a location information proxy 1002 for receiving a request for location information associated with a subscriber, hereinafter referred to as subscriber location information. In response to receiving the subscriber location information request, location information proxy 1002 accesses one or more of a number portability database 1004, a technology migration database 1006, and a location database 1008 to determine the subscriber location information, which location information proxy 1002 communicates to the entity that requested the location information.

In the embodiment illustrated in FIG. 10, location information database 1008 may be a home location register, or HLR, in which case location information proxy 1002 may also be referred to as HLR proxy 1002.

HLR proxy 1002 may receive subscriber location information requests from entities within network 1000 that process signaling messages that are associated with a mobile subscriber. In the embodiment illustrated in FIG. 10, HLR proxy 1002 may receive subscriber location information requests from a mobile switching center (MSC) node, such as MSC 1010. Example requests include SS7 mobile application part (MAP) messages, such as a send routing information (SRI) message.

HLR proxy 1002 responds to the subscriber location information request by sending the subscriber location information to the requesting entity. Example responses include MAP messages, such as the send routing information acknowledge (SRI_ACK) message. Other message protocols may be used.

The location information provided by HLR proxy 1002 may include the address or other identifier of a node in the network that is currently serving the mobile subscriber or to which call setup messages, such as ISUP IAM, SAM, or BICC messages, should be directed for the purpose of setting up a call with the mobile subscriber. In the embodiment illustrated in FIG. 10, network 1000 includes three switches, SW1 1012A, SW2 1012B, and SW3 1012C.

In one embodiment, technology migration database 1006 includes current technology registration information for dual mode subscribers and where HLR proxy 1002 accesses the current technology registration information to determine a technology type for which the subscriber is currently registered.

In one embodiment, HLR proxy 1002 and one or more of one or more of number portability database 1012, technology migration database 1014, and location database 1016 are components of a signal routing node, such as a signal transfer point (STP).

Figure 11:
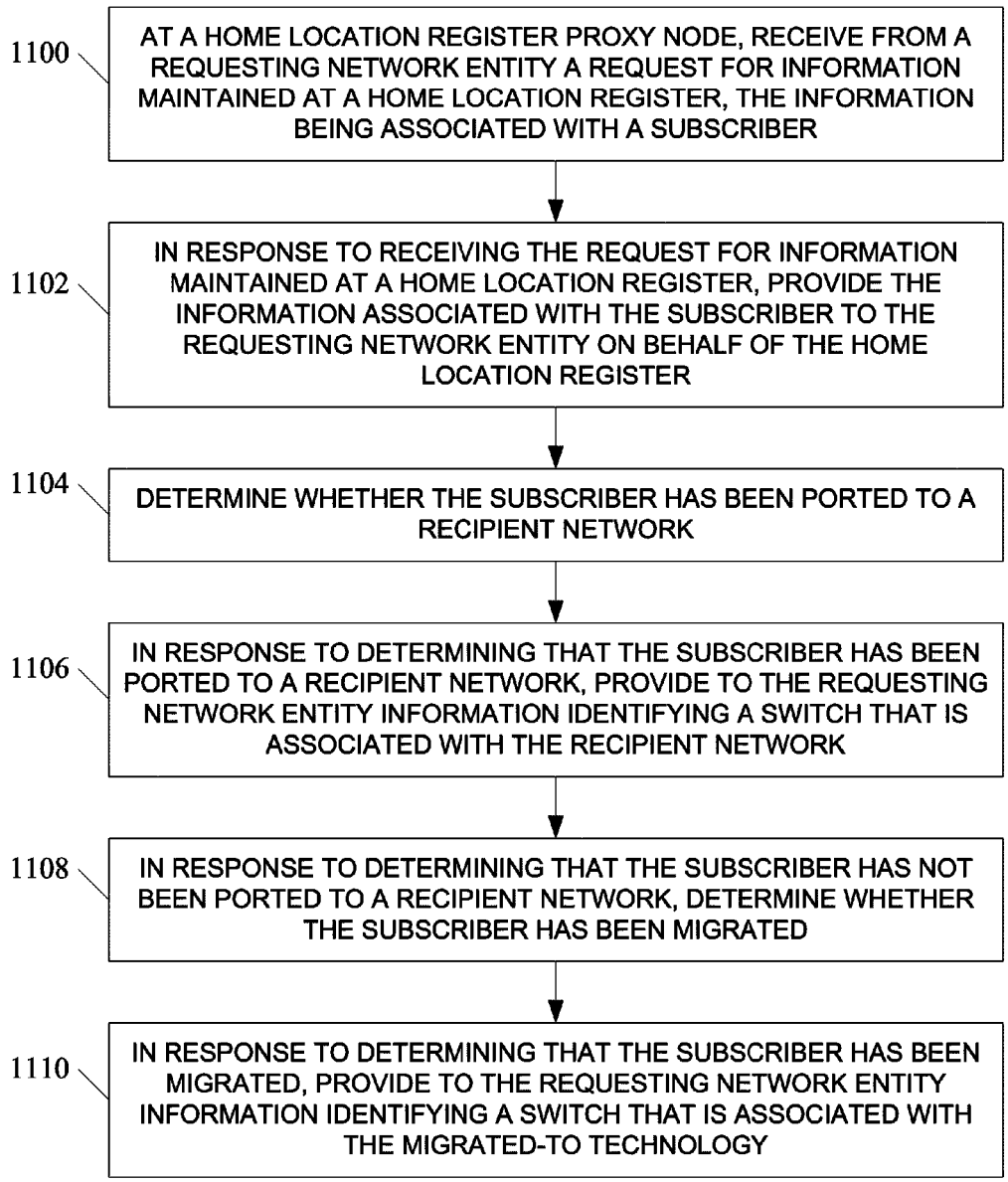
FIG. 11 is a flow chart illustrating an exemplary process for providing a home location register proxy according to an embodiment of the subject matter described herein.

FIG. 11 is a flow chart illustrating an exemplary process for providing a home location register proxy according to an embodiment of the subject matter described herein. This process will now be described in reference to FIGS. 10 and 11.

At block 1100, a home location register proxy node receives, from a requesting network entity, a request for subscriber information maintained at a home location register, the information being associated with a subscriber. For example, in the embodiment illustrated in FIG. 10, HLR proxy 1002 may receive a SRI message from MSC 1010, where the SRI identifies a called party subscriber.

At block 1102, in response to receiving the request for subscriber information maintained at a home location register, the home location register proxy node provides the information associated with the subscriber to the requesting network entity on behalf of the home location register. The steps of this process are listed in detail starting at block 1104.

At block 1104, it is determined whether the subscriber has been ported to a recipient network. For example, in the embodiment illustrated in FIG. 10, HLR proxy 1002 may issue a number portability (NP) query to number portability database 1004 to determine whether the subscriber has been ported to another network.

At block 1106, in response to determining that the subscriber has been ported to a recipient network, the identity of a switch that is associated with the recipient network is provided to the requesting network entity. For example, in the embodiment illustrated in FIG. 10, if the subscriber has been ported to a donor network, the NP database 1004 may return a location routing number (LRN), uniform resource identifier (URI), IP address/port, SS7 point code address, or other switch identifier associated with the recipient network.

At block 1108, in response to determining that the subscriber is not ported to a recipient network, it is determined whether the subscriber has been migrated to a different technology. In the embodiment illustrated in FIG. 10, HLR proxy 1002 may query technology migration database 1006 using the identity of the subscriber to determine whether the subscriber has been migrated to a different technology.

At block 1110, in response to determining that the subscriber has been migrated to a different technology, the identity of a switch that is associated with the migrated-to technology is provided to the requesting network entity. In the embodiment illustrated in FIG. 10, network 1000 may include switches of different technologies. For example, in one embodiment, SW1 1012A may be GSM switch, SW2 1012B may be an IS-41 switch, and SW3 1012C may be an IMS switch, and LTE switch, or a switch of yet another technology. Depending on the migrated-to technology of the subscriber, HLR proxy 1002 may respond to MSC 1010 with the network address of SW1 1012A, SW2 1012B, or SW3 1012C.

Figure 12:
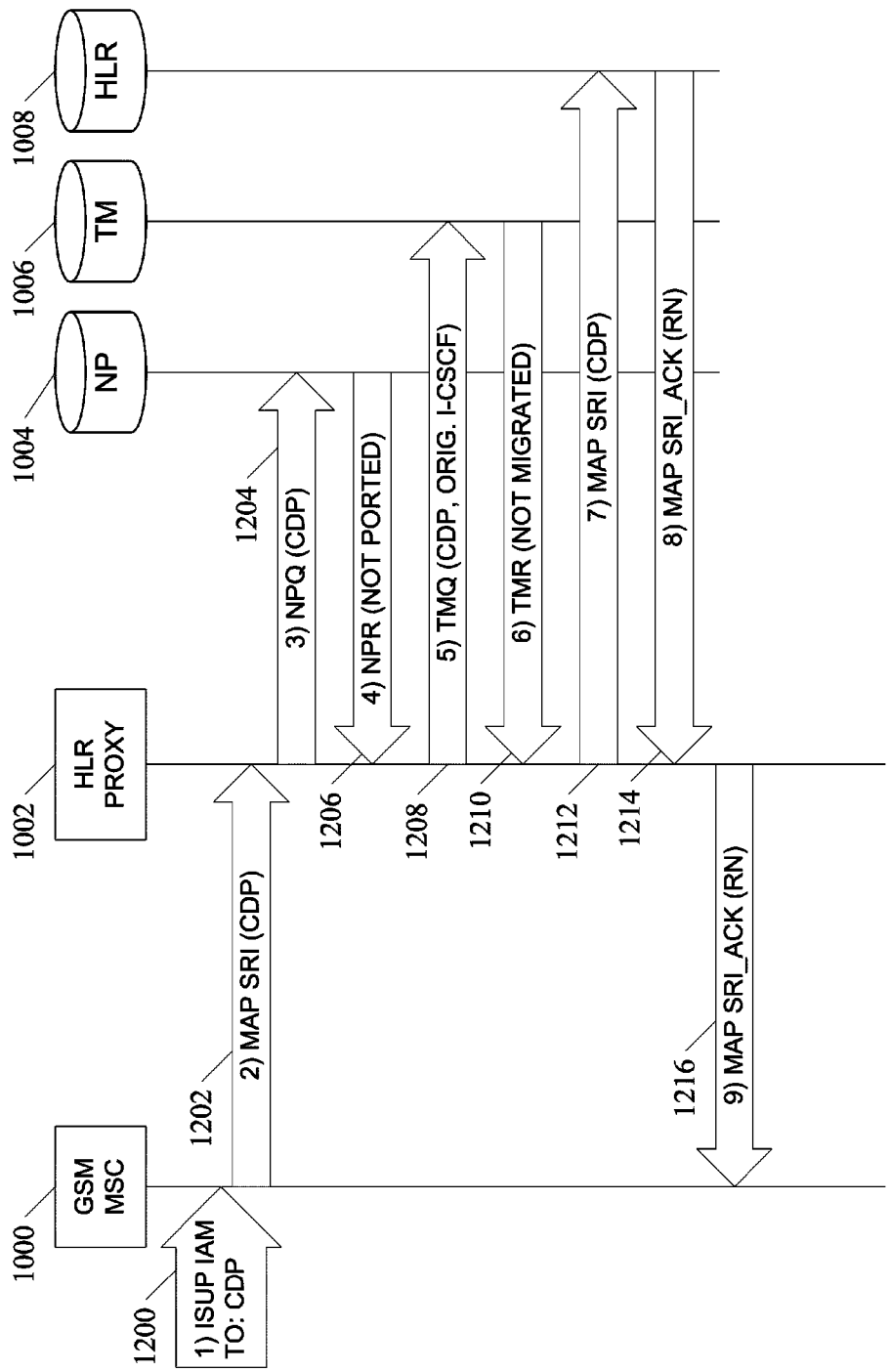
FIG. 12 is an exemplary call flow diagram illustrating signaling messages exchanged during an exemplary process for providing a home location register proxy according to an embodiment of the subject matter described herein, where a GSM subscriber is not ported or migrated to a different technology.

FIG. 12 is an exemplary call flow diagram illustrating signaling messages exchanged during an exemplary process for providing a home location register proxy according to an embodiment of the subject matter described herein, where a GSM subscriber is not ported or migrated to a different technology. FIG. 12 illustrates a network containing a mobile switching center MSC 1000, HLR proxy 1002, number portability database 1004, technology migration database 1006, and home location register 1008. In FIG. 12, MSC 1000 receives an Integrated services digital network user part (ISUP) initial address message 1200 for attempting to place a call to subscriber CDP. MSC 1000 issues a mobile application part (MAP) send routing information (SRI) message 1202 to HLR proxy 1002. To determine whether subscriber CDP has been ported out of the network, HLR proxy 1002 sends a number portability request 1204 to number portability database 1004. In the embodiment illustrated in FIG. 12, NP database 1004 sends a number portability response 1206 indicating that subscriber CDP is not ported.

HLR proxy 1002 then issues a technology migration query 1208 to TM database 1006 to determine whether subscriber CDP has been migrated to a different technology. In the embodiment illustrated in FIG. 12, TM database 1006 sends a technology migration response 1210 indicating that subscriber CDP has not been migrated to a different technology. Technology migration response 1210 identifies a serving switch of the appropriate network technology, identified by RN.

HLR proxy 1002 then issues a MAP SRI message 1212 to HLR 1008. HLR 1008 responds with a MAP SRI_ACK message 1214 identifying the switch that is associated with the subscriber. In the embodiment illustrated in FIG. 12, the switch is identified by a visited mobile switching center (vMSC) address or routing number (RN). In other embodiments, the switch may be identified by network names, network addresses, or other forms of identification.

Finally, HLR proxy 1002 communicates the identity of the serving switch to the requesting network entity, by sending MAP SRI_ACK message 1216 to MSC 1000, the message including the LRN of the switch that currently serves subscriber CDP.

Figure 13:
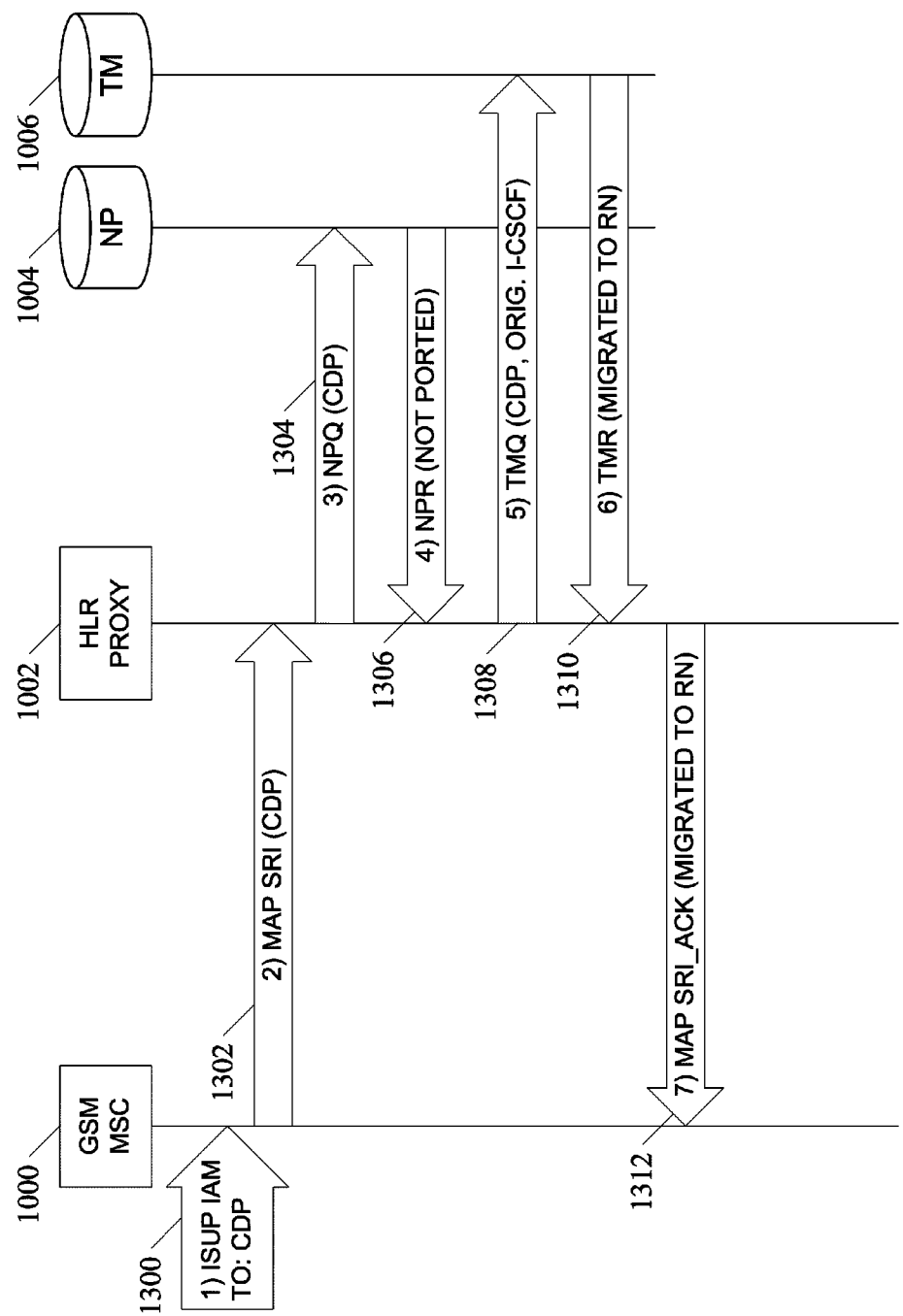
FIG. 13 is an exemplary call flow diagram illustrating signaling messages exchanged during an exemplary process for providing a home location register proxy according to an embodiment of the subject matter described herein, where a GSM subscriber is not ported but is migrated to a different technology.

FIG. 13 is an exemplary call flow diagram illustrating signaling messages exchanged during an exemplary process for providing a home location register proxy according to an embodiment of the subject matter described herein, where a GSM subscriber is not ported but is migrated to a different technology. The functions of MSC 1000, HLR proxy 1002, NP 1004, TM 1006, and HLR 1008 are essentially identical to their like-numbered counterparts in FIG. 10, and therefore descriptions of their functions will not be repeated here In FIG. 13, MSC 1000 receives an integrated services digital network user part (ISUP) initial address message 1300 for attempting to place a call to subscriber CDP. MSC 1000 issues a mobile application part (MAP) send routing information (SRI) message 1302 to HLR proxy 1002. To determine whether subscriber CDP has been ported out of the network, HLR proxy 1002 sends a number portability request 1304 to number portability database 1004. In the embodiment illustrated in FIG. 13, NP database 1004 sends a number portability response 1306 indicating that subscriber CDP is not ported.

HLR proxy 1002 then issues a technology migration query 1308 to TM database 1006 to determine whether subscriber CDP has been migrated to a different technology. In the embodiment illustrated in FIG. 13, TM database 1006 sends a technology migration response 1310 indicating that subscriber CDP has been migrated to a different technology. Technology migration response 1310 identifies a serving switch of the appropriate network technology, identified by RN.

Finally, HLR proxy 1002 communicates the identity of the serving switch to the requesting network entity, by sending MAP SRI_ACK message 1312 to MSC 1000, the message

What is claimed is:

1. A method for providing a home subscriber server proxy, the method comprising:
   at a home subscriber server (HSS) proxy separate from a home subscriber server in a telecommunications network, wherein the home subscriber server maintains subscriber location information:
      receiving, from a requesting network entity, a request for information maintained at the home subscriber server, the information being associated with a subscriber; and
      in response to receiving the request for information maintained at home subscriber server, providing, from the HSS proxy, the information associated with the subscriber to the requesting network entity on behalf of the home subscriber server, wherein providing the information associated with the subscriber on behalf of the home subscriber server comprises performing a number portability lookup in a number portability database associated with the HSS proxy, determining whether the subscriber is ported out, and in response to determining that the subscriber is ported out, returning information identifying a switch currently serving the subscriber in a network to which the subscriber has been ported.

2. The method of claim 1 wherein providing the information associated with the subscriber to the requesting network entity on behalf of the home subscriber server comprises:
   in response to determining that the subscriber is not ported out, determining whether the subscriber has been migrated to a different technology, and, in response to determining that the subscriber has been migrated to a different technology, providing, to the requesting network entity, information identifying a switch that is associated with the migrated-to technology.

3. The method of claim 2 wherein providing the information associated with the subscriber to the requesting network entity on behalf of the home subscriber server further comprises:
   determining that the subscriber is not ported out or migrated to a different technology; and
   in response to determining that the subscriber is not ported out or migrated to a different technology, querying the home subscriber server to retrieve the information associated with the subscriber, and providing, to the requesting network entity, the information retrieved from the home subscriber server.

4. The method of claim 1 wherein receiving the request for information maintained at a home subscriber server comprises receiving a request for location information associated with the subscriber.

5. The method of claim 1 wherein receiving the request for information maintained at a home subscriber server comprises receiving a Diameter protocol request.

6. The method of claim 5 wherein receiving the Diameter protocol request comprises receiving a location information request (LIR) message and wherein providing the information associated with the subscriber to the requesting network entity comprises sending a location information answer (LIA) message to the requesting network entity.

7. The method of claim 1 wherein receiving a request for subscriber information from a requesting network entity comprises receiving a request from a call session control function (CSCF).

8. The method of claim 7 wherein the CSCF sends the request in response to receiving a session initiation protocol (SIP) INVITE message.

9. The method of claim 1 wherein the information that identifies the switch currently serving the subscriber comprises at least one of: a location routing number (LRN); a universal resource identifier (URI); an Internet protocol (IP) address; and a signaling system number 7 (SS7) point code.

10. The method of claim 1 comprising, at the network node, correlating TCP connections with switches and SCTP associations with HSS nodes.

11. A system for providing a home subscriber server proxy, the system comprising:
    at least one database that includes number portability information, technology migration information, and information maintained at a home subscriber server that maintains information about subscriber location; and
    a home subscriber server proxy node for receiving, from a requesting network entity, a request for information maintained at the home subscriber server, the information being associated with a subscriber, and, in response to receiving the request for information maintained at the home subscriber server, providing, from the HSS proxy node, the information associated with the subscriber to the requesting network entity on behalf of the home subscriber server, wherein providing the information associated with the subscriber on behalf of the home subscriber server comprises performing a number portability lookup in a number portability database associated with the HSS proxy, determining whether the subscriber is ported out, and in response to determining that the subscriber is ported out, returning information identifying a switch currently serving the subscriber in a network to which the subscriber has been ported.

12. The system of claim 11 wherein the home subscriber server proxy node is configured to provide the information associated with the subscriber to the requesting network entity on behalf of the home subscriber server by:
    in response to determining that the subscriber is not ported out, determining whether the subscriber has been migrated to a different technology, and, in response to determining that the subscriber has been migrated to a different technology, providing, to the requesting network entity, information identifying a switch that is associated with the migrated-to technology.

13. The system of claim 11 wherein the home subscriber server proxy node is configured to provide the information associated with the subscriber to the requesting network entity on behalf of the home subscriber server by, in response to determining that the subscriber is not ported out or migrated to a different technology, querying the home subscriber server to retrieve the information associated with the subscriber, and providing, to the requesting network entity, the information retrieved from the home subscriber server.

14. The system of claim 11 wherein the at least one database includes a single home subscriber server proxy database and wherein the home subscriber server proxy accesses the number portability information, the technology migration information, and the information maintained at a home subscriber server in single access to the database.

15. The system of claim 11 wherein the at least one database includes current technology registration information for dual mode subscribers and wherein the home subscriber server proxy accesses the current technology registration information to determine a technology type for which the subscriber is currently registered.

16. The system of claim 11 wherein the home subscriber server proxy and the at least one database are components of a signal transfer point.

17. The system of claim 11 wherein the requesting network entity comprises a session initiation protocol (SIP) routing node.

18. The system of claim 11 wherein the request for information maintained at a home subscriber server comprises a request for location information associated with the subscriber.

19. The system of claim 11 wherein the request for information maintained at a home subscriber server comprises a Diameter protocol message.

20. The system of claim 11 wherein the home subscriber server proxy is configured to correlate TCP connections with switching nodes and SCTP associations with HSS nodes.

21. A non-transitory computer readable medium having stored thereon executable instructions that when executed by the processor of a computer control the computer to perform steps comprising:

receiving, at a home subscriber server (HSS) proxy separate from a home subscriber server and from a requesting network entity, a request for information maintained at the home subscriber server, the information being associated with a subscriber, wherein the home subscriber server maintains subscriber location information; and in response to receiving the request for information maintained at the home subscriber server, providing, from the HSS proxy, the information associated with the subscriber to the requesting network entity on behalf of the home subscriber server, wherein providing the information associated with the subscriber on behalf of the home subscriber server comprises performing a number portability lookup in a number portability database associated with the HSS proxy, determining whether the subscriber is ported out, and in response to determining that the subscriber is ported out, returning information identifying a switch currently serving the subscriber in a network to which the subscriber has been ported.

* * * * *